United States Patent
Mitsumoto et al.

(10) Patent No.: US 10,446,842 B2
(45) Date of Patent: Oct. 15, 2019

(54) 5V-CLASS SPINEL-TYPE LITHIUM-MANGANESE-CONTAINING COMPOSITE OXIDE

(71) Applicant: Mitsui Mining & Smelting Co., Ltd., Tokyo (JP)

(72) Inventors: Tetsuya Mitsumoto, Takehara (JP); Kyohei Yamaguchi, Takehara (JP); Toshikazu Matsuyama, Takehara (JP); Hideaki Matsushima, Takehara (JP); Shinya Kagei, Takehara (JP)

(73) Assignee: Mitsui Mining & Smelting Co., Ltd., Tokyo (JP)

(*) Notice: Subject to any disclaimer, the term of this patent is extended or adjusted under 35 U.S.C. 154(b) by 384 days.

(21) Appl. No.: 15/513,331

(22) PCT Filed: Apr. 28, 2016

(86) PCT No.: PCT/JP2016/063452
§ 371 (c)(1),
(2) Date: Mar. 22, 2017

(87) PCT Pub. No.: WO2016/175311
PCT Pub. Date: Nov. 3, 2016

(65) Prior Publication Data
US 2017/0309908 A1 Oct. 26, 2017

(30) Foreign Application Priority Data
Apr. 30, 2015 (JP) ................ 2015-093288

(51) Int. Cl.
| | | |
|---|---|---|
| *H01M 4/505* | (2010.01) | |
| *H01M 4/525* | (2010.01) | |
| *H01M 10/0525* | (2010.01) | |
| *C01G 53/00* | (2006.01) | |
| *C01G 49/00* | (2006.01) | |
| *C01G 51/00* | (2006.01) | |
| *H01M 4/02* | (2006.01) | |
| *H01M 10/052* | (2010.01) | |

(52) U.S. Cl.
CPC ......... *H01M 4/505* (2013.01); *C01G 49/009* (2013.01); *C01G 51/54* (2013.01); *C01G 53/54* (2013.01); *C01G 53/70* (2013.01); *H01M 4/525* (2013.01); *H01M 10/0525* (2013.01); *C01P 2002/01* (2013.01); *C01P 2002/32* (2013.01); *C01P 2002/50* (2013.01); *C01P 2002/60* (2013.01); *C01P 2002/76* (2013.01); *C01P 2004/62* (2013.01); *C01P 2006/11* (2013.01); *C01P 2006/12* (2013.01); *C01P 2006/80* (2013.01); *C01P 2006/82* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | |
|---|---|---|
| 2012/0034503 A1 | 2/2012 | Toyama et al. |
| 2013/0011726 A1 | 1/2013 | Takano et al. |
| 2014/0004416 A1 | 1/2014 | Sano et al. |
| 2014/0034872 A1 | 2/2014 | Watanabe et al. |
| 2014/0252268 A1 | 9/2014 | Kagei et al. |
| 2016/0118649 A1 | 4/2016 | Yamomoto et al. |

FOREIGN PATENT DOCUMENTS

| | | |
|---|---|---|
| CN | 102969498 A | 3/2013 |
| CN | 103956481 A | 7/2014 |
| JP | 11-073962 A | 3/1999 |
| JP | 2000-235857 A | 8/2000 |
| JP | 2003-197194 A | 7/2003 |
| JP | 2012-38534 A | 2/2012 |
| JP | 2014-130851 A | 7/2014 |
| JP | 2014-166951 A | 9/2014 |
| WO | 2011/083861 A1 | 7/2011 |
| WO | 2012/132155 A1 | 10/2012 |
| WO | 2012/133731 A1 | 10/2012 |
| WO | 2014/030764 A1 | 2/2014 |
| WO | 2014/185343 A1 | 11/2014 |

*Primary Examiner* — Sarah A. Slifka
(74) *Attorney, Agent, or Firm* — The Webb Law Firm

(57) ABSTRACT

Provided is a new 5 V class spinel-type lithium manganese-containing composite oxide which enables the expansion of a high potential capacity region and the suppression of gas generation. The 5 V class spinel-type lithium manganese-containing composite oxide has an operating potential of 4.5 V or more at a metal Li reference potential, and contains Li, Mn, O and two or more other elements. The spinel-type lithium manganese-containing composite oxide is characterized in that, in an electronic diffraction image from a transmission electron microscope (TEM), a diffraction spot observed in the Fd-3m structure as well as a diffraction spot not observed in the Fd-3m structure are confirmed.

20 Claims, 2 Drawing Sheets

Example 1  Crystal zone axis <100>
Diffraction image

Crystal zone axis <100>
Comparative Example 4    Diffraction image

5V-CLASS SPINEL-TYPE LITHIUM-MANGANESE-CONTAINING COMPOSITE OXIDE

CROSS-REFERENCE TO RELATED APPLICATIONS

This application is the United States national phase of International Application No. PCT/JP2016/063452 filed Apr. 28, 2016, and claims priority to Japanese Patent Application No. 2015-093288 filed Apr. 30, 2015, the disclosures of which are hereby incorporated in their entirety by reference.

TECHNICAL FIELD

The present invention relates to a spinel-type lithium manganese-containing composite oxide that can be used as a positive electrode active material for lithium secondary batteries, and particularly, to a 5 V class spinel-type lithium manganese-containing composite oxide having an operating potential of 4.5 V or more at a metal Li reference potential.

BACKGROUND ART

Lithium secondary batteries have features such as high energy density and long service life. Therefore, lithium secondary batteries are widely used as power supplies for electric appliances such as video cameras, portable electronic devices such as laptop computers and mobile telephones, and electric tools such as power tools. Recently, lithium secondary batteries are also applied to large-sized batteries that are mounted in electric vehicles (EVs), hybrid electric vehicles (HEVs) and the like.

A lithium secondary battery is a secondary battery having a structure in which, at the time of charging, lithium begins to dissolve as ions from the positive electrode and moves to the negative electrode to be stored therein, and at the time of discharging, lithium ions return from the negative electrode to the positive electrode, and it is known that the higher energy density of the lithium secondary battery is attributable to the electric potential of the positive electrode material.

Known examples of this kind of positive electrode active material for lithium secondary batteries include lithium transition metal oxides having a layered structure, such as $LiCoO_2$, $LiNiO_2$, and $LiMnO_2$, and spinel-type lithium manganese-containing composite oxides having a manganese-based spinel structure (Fd-3m), such as $LiMn_2O_4$ and $LiNi_{0.5}Mn_{1.5}O_4$.

The spinel-type lithium manganese-containing composite oxides of this kind, because of being low in raw material prices and being nontoxic and safe, and furthermore having a property durable to overcharge, are paid attention to as next-generation positive electrode active substances for large-size batteries for electric vehicles (EVs), hybrid electric vehicles (HEVs) and the like. Furthermore, since spinel-type lithium transition metal oxides (LMOs) that are capable of three-dimensionally intercalating and deintercalating of Li ions have superior output characteristics compared with lithium transition metal oxides having a layered structure such as $LiCoO_2$, it is expected to be used in an application where excellent output characteristics are required, such as in batteries for EVs and batteries for HEVs.

Among others, it has been known to have an operating potential at near 5 V by substituting a part of the Mn sites in $LiMn_2O_4$ with other transition metals (Cr, Co, Ni, Fe, or Cu). Thus, at present, development of a 5 V class spinel-type lithium manganese-containing composite oxide having an operating potential of 4.5 V or more at a metal Li reference potential is being carried out.

For example, Patent Document 1 discloses, as a positive electrode active material for lithium secondary batteries exhibiting an electromotive force of 5 V class, a high capacity spinel-type lithium manganese composite oxide positive electrode active material, comprising a spinel-type lithium manganese composite oxide added with chromium as an essential additive component, and further, nickel or cobalt.

Patent Document 2 discloses a crystal having a spinel structure, $LiMn_{2-y-z}Ni_yM_zO_4$ (wherein M represents at least one selected from the group consisting of Fe, Co, Ti, V, Mg, Zn, Ga, Nb, Mo and Cu, $0.25 \leq y \leq 0.6$, and $0 \leq z \leq 0.1$), which performs charging and discharging at a potential of 4.5 V or more with respect to Li metal.

Patent Document 3 discloses, as a positive electrode active material capable of generating an electromotive force of 4.5 V or more and maintaining a discharge capacity, a positive electrode active material for secondary batteries containing a spinel-type lithium manganese composite oxide represented by a general formula: $Li_a(M_xMn_{2-x-y}A_y)O_4$ (wherein $0.4 < x$, $0 < y$, $x+y < 2$, $0 < a < 1.2$; M includes one or more metal elements selected from the group consisting of Ni, Co, Fe, Cr and Cu and contains at least Ni; A includes at least one metal element selected from Si and Ti, and in a case where A includes only Ti, the value of the ratio y of A is $0.1 < y$).

Patent Document 4 discloses, in a spinel-type lithium manganese-containing composite oxide having an operating potential of 4.5 V or more at a metal Li reference potential, a spinel-type lithium manganese-containing composite oxide containing a crystal phase formed by substituting a part of the Mn site in $LiMn_2O_{4-\delta}$ with Li, a metal element M1 including Ni (M1 is a metal element containing at least one of Ni, Co and Fe), and another metal element M2 (M2 is Ti or a metal element containing Ti and at least one of Mg, Al, Ba, Cr and Nb), wherein the spinel-type lithium manganese-containing composite oxide contains a composite oxide phase including Ni, Mn and B.

Patent Document 5 discloses a manganese-based spinel-type lithium transition metal oxide represented by $Li[Ni_yMn_{2-(a+b)-y-z}Li_aTi_bM_z]O_4$ (wherein $0 \leq z \leq 0.3$, $0.3 \leq y < 0.6$, and M is at least one or more metal elements selected from the group consisting of Al, Mg, Fe and Co), wherein $a > 0$, $b > 0$, $2-(a+b)-y-z < 1.7$, and $3 < b/a \leq 8$ in the above formula.

CITATION LIST

Patent Document 1: Japanese Patent Application Laid-Open (JP-A) No. H11-73962
Patent Document 2: JP-A No. 2000-235857
Patent Document 3: JP-A No. 2003-197194
Patent Document 4: JP-A No. 2014-130851
Patent Document 5: JP-A No. 2014-166951

A 5 V class spinel-type lithium manganese-containing composite oxide having an operating potential of 4.5 V or more has a problem which is hardly occurred with a 4 V class spinel-type lithium manganese-containing composite oxide, that is, a characteristic problem in which the amount of gas generation generated by reacting with an electrolyte is large.

It can be seen that when using the 5 V class spinel-type lithium manganese-containing composite oxide, the amount of gas generation increases, whereas a plateau region at near 4.5 V can be expanded, a high potential capacity region can be expanded, and thus energy density can be increased. For this reason, in regard to the 5 V class spinel-type lithium manganese-containing composite oxide, it has been difficult to achieve both the increasing of energy density by expanding the high potential capacity region, and the suppressing of the gas generation amount.

SUMMARY OF THE INVENTION

Therefore, the present invention provides a new 5 V class spinel-type lithium manganese-containing composite oxide capable of achieving both the expansion of the high potential capacity region and the suppression of the gas generation.

The present invention proposes a spinel-type lithium manganese-containing composite oxide, comprising Li, Mn, O and two or more other elements, and having an operating potential of 4.5 V or more at a metal Li reference potential, wherein, in an electronic diffraction image from a transmission electron microscope (TEM), a diffraction spot which is observed in Fd-3m structure as well as a diffraction spot which is not observed in the Fd-3m structure are confirmed.

In addition, the present invention proposes a spinel-type lithium manganese-containing composite oxide, comprising Li, Mn, O and two or more other elements, and having an operating potential of 4.5 V or more at a metal Li reference potential, wherein, in an electronic diffraction image from a transmission electron microscope (TEM), a diffraction spot which is observed in P4$_3$32 structure is confirmed.

The spinel-type lithium manganese-containing composite oxide proposed by the present invention has an operating potential of 4.5 V or more at a metal Li reference potential, and yet gas generation can be suppressed, a plateau region at near 4.5 V can be expanded, a high potential capacity region can be expanded, and thus an increase of energy density can also be attempted. Therefore, according to the spinel-type lithium manganese-containing composite oxide proposed by the present invention, both the expansion of the high potential capacity region and the suppression of the gas generation can be achieved. Further, by comprising Li, Mn, O and two or more other elements, the crystal structure can be stabilized, and thus the cycle characteristics can be enhanced.

DESCRIPTION OF THE INVENTION

Figure 1:
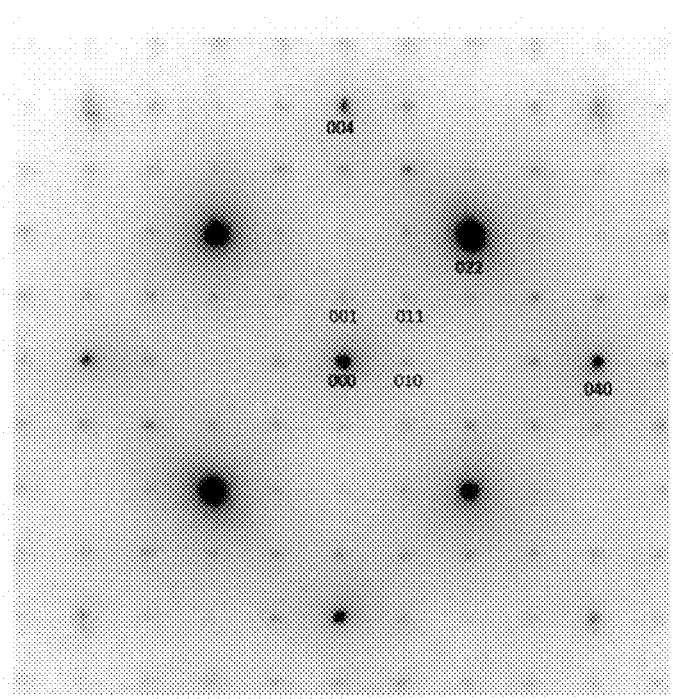
FIG. 1 is an electron diffraction image of a lithium manganese-containing composite oxide obtained in Example 1 from a transmission electron microscope (TEM).

Next, the present invention will be described based on embodiments for carrying out the present invention. However, the present invention is not intended to be limited to the exemplary embodiments that will be described below.

<Present 5 V Class Spinel>

The spinel-type lithium manganese-containing composite oxide according to one example of embodiments of the present invention (referred to as "present 5 V class spinel") is a 5 V class spinel-type lithium manganese-containing composite oxide which is fitted to a crystal structure model of a cubic crystal of a space group Fd-3m (Origin Choice 2), and having an operating potential of 4.5 V or more at a metal Li reference potential, wherein Rwp and S which represent the degree of coincidence of an observed intensity with a calculated intensity are Rwp<10 or S<2.5.

At this time, the "having an operating potential of 4.5 V or more at a metal Li reference potential" is meant to include a case in which the present 5 V class spinel need not have an operating potential of 4.5 V or more as a plateau region, and has a part of operating potential of 4.5 V or more.

From this point of view, the present 5 V class spinel is not limited to a lithium manganese-containing composite oxide composed only of the "5 V class lithium manganese-containing composite oxide" having an operating potential of 4.5 V or more as a plateau region. For example, the present 5 V class spinel may contain a "4 V class lithium manganese-containing composite oxide" having an operating potential of less than 4.5 V as a plateau region. Specifically, a lithium manganese-containing composite oxide in which 30% by mass or more of the 5 V class lithium manganese-containing composite oxide may occupy, preferably 50% by mass or more thereof, and more preferably 80% by mass or more thereof (including 100% by mass) occupy.

The present 5 V class spinel is a spinel-type lithium manganese-containing composite oxide comprising Li, Mn, O and two or more other elements.

At this time, at least one element from the above "two or more other elements" may be selected from the group consisting of Ni, Co and Fe, and another element may be selected from the group consisting of Mg, Ti, Al, Ba, Cr, W, Mo, Y, Zr and Nb.

A preferred composition example of the present 5 V class spinel may be a composition which contains a spinel-type lithium manganese-containing composite oxide having a crystal structure in which a part of the Mn sites in LiMn$_2$O$_{4-\delta}$ are substituted with Li, a metal element M1, and a metal element M2.

The metal element M1 is a substitution element mainly contributing in exhibiting an operating electric potential of 4.5 V or more at a metal Li reference potential, and examples thereof include Ni, Co, and Fe. The metal element M1 may contain at least one of these elements, and may also contain other metal elements.

The metal element M2 is a substituent element mainly contributing in stabilizing the crystal structure to enhance the characteristics, and examples of a substituent element that contributes to an increase of the capacity retention rate include, for example, Mg, Ti, Al, Ba, Cr, W, Mo, Y, Zr and Nb. The metal element M2 may contain at least one of these Mg, Ti, Al, Ba, Cr, W, Mo, Y, Zr and Nb, and may also contain other metal elements.

An example of the present 5 V class spinel may be a spinel-type lithium manganese-containing composite oxide represented by formula (1): Li[Li$_a$Mn$_{2-a-b-c}$M1$_b$M2$_c$]O$_{4-\delta}$. M1 and M2 in the formula (1) are as described above.

In the above formula (1), the value of "a" may be 0.00 to 0.20, and among others, "a" is more preferably 0.01 or more or 0.10 or less, and even more preferably 0.02 or more or 0.08 or less.

The value of "b" that represents the content of M1 may be 0.20 to 1.20, and among others, "b" is more preferably 0.30 or more or 1.10 or less, and even more preferably 0.35 or more or 1.05 or less.

The value of "c" that represents the content of M2 may be 0.001 to 0.400, and among others, "c" is more preferably 0.002 or more or 0.400 or less, even more preferably 0.005 or more or 0.30 or less, and even more preferably 0.10 or more. In particular, when the "c" is 0.10 or more, the amount of gas generation can be more effectively suppressed. Meanwhile, the term "4-δ" in each of the above formulae implies that the composite oxide may also contain oxygen deficiency, and a part of oxygen may be substituted with fluorine.

However, the present 5 V class spinel may contain other components other than Li, Mn, M1, M2 and O. In particular, the other elements may be contained if at 0.5% by weight or less respectively. This is because if the content is this much amount, it may be considered that the other elements would hardly affect the performance of the present 5 V class spinel.

In addition, an example of the present 5 V class spinel may be a spinel-type lithium manganese-containing composite oxide represented by formula (2): Li[Li$_a$Mn$_{2-a-b-c}$Ni$_b$M2$_c$]O$_{4-δ}$.

In the formula (2), "a", "b", "c" and "4-δ" are same as those described in the above formula (1), respectively.

Further, preferred examples of M2 in the formula (2) may include Mg, Ti, Al, Ba, Cr, W, Mo, Y, Zr, Co, Fe, and Nb. The metal element M2 may contain at least one of these Mg, Ti, Al, Ba, Cr, W, Mo, Y, Zr, Co, Fe, and Nb, and may also contain other metal elements.

Among others, it is more preferable to contain Ti or Al, or both of the elements as M2.

In the above formula (2), the value of "a" may be 0.00 to 0.20, and among others, "a" is more preferably 0.01 or more or 0.10 or less, and even more preferably 0.02 or more or 0.08 or less.

The value of "b" that represents the content of M1 may be 0.20 to 0.70, and among others, "b" is more preferably 0.30 or more or 0.60 or less, even more preferably 0.35 or more or 0.55 or less, and even more preferably 0.49 or less. In particular, when the "b" is 0.49 or less, the cycle characteristics in a high potential range can be more effectively enhanced.

The value of "c" that represents the content of M2 may be 0.001 to 0.400, and among others, "c" is more preferably 0.002 or more or 0.400 or less, even more preferably 0.005 or more or 0.300 or less, and even more preferably 0.10 or more. In particular, when the "c" is 0.10 or more, the amount of gas generation can be more effectively suppressed.

In addition, the present 5 V class spinel may contain B. In so doing, a composite oxide phase containing Ni, Mn and B may be contained as a state in which B is present, in addition to the spinel crystal phase.

Examples of the composite oxide phase containing Ni, Mn and B may include a crystal phase of Ni$_5$MnO$_4$(BO$_3$)$_2$.

Whether the crystal phase of Ni$_5$MnO$_4$(BO$_3$)$_2$ is contained can be confirmed by collating a diffraction pattern obtained by X-ray diffraction (XRD) with PDF (Powder Diffraction File) No. "01-079-1029".

It is suspected that the composite oxide phase containing Ni, Mn and B presents at the surface of the present 5 V class spine particles or at the grain boundaries.

In regard to the content of the composite oxide phase containing Ni, Mn and B, it is preferable to contain the composite oxide phase such that the content of element B in the present 5 V class spinel would be 0.02 to 0.80% by mass, more preferably 0.05% by mass or more or 0.60% by mass or less, and even more preferably 0.30% by mass or less, particularly preferably, 0.25% by mass or less.

When the content of element B is 0.02% by mass or more, the discharge capacity at a high temperature (for example, 45° C.) can be maintained, and when the content of element B is 0.80% by mass or less, the rate capability can be maintained, which is preferable.

<Characteristics of Present 5 V Class Spinel>

As described above, the present 5 V class spinel is, in an X-ray diffraction pattern measured by a powder X-ray diffractometer (XRD) using CuKα1 ray, a 5 V class spinel which is fitted to a crystal structure model of a cubic crystal of a space group Fd-3m (Origin Choice 2), wherein Rwp and S which represent the degree of coincidence of an observed intensity with a calculated intensity are Rwp<10 or S<2.5.

At this time, when Rwp and S are Rwp <10 or S <2.5, it can be said that the observed intensity and the calculated intensity are sufficiently coincident. From such point of view, RWP is preferably less than 8, and more preferably less than 6. S is preferably more than 1.0 or less than 2.3, and more preferably less than 2.1.

In addition, the present 5 V class spinel has features that, in an electronic diffraction image from a transmission electron microscope (TEM), a diffraction spot which is observed in Fd-3m structure as well as a diffraction spot which is not observed in the Fd-3m structure are confirmed.

As a result of a number of tests performed by the inventors of the present invention, in regard to the 5 V class spinel comprising Li, Mn, O and two or more other elements and having features in which a diffraction spot which is observed in Fd-3m structure as well as a diffraction spot which is not observed in the Fd-3m structure are confirmed, it has been confirmed that, in an electronic diffraction image from a TEM, a shoulder at near 4 V is disappeared, a plateau region at near 4.5 V is expanded, a high potential capacity region is expanded, and thus energy density is increased, compared to the 5 V class spinel having features in which only a diffraction spot which is observed in the Fd-3m structure is confirmed. In addition, it has been found that gas generation can also be suppressed.

It is preferable that the diffraction spot which is not observed in the Fd-3m structure has an intensity equal to or lower than that of the diffraction spot which is observed in the Fd-3m structure.

The "diffraction spot which is not observed in the Fd-3m structure" is a diffraction spot such as 001, 011 and 010 in a diffraction image of incidence from crystal zone axis <100>, for example, when the indexing of the diffraction spot and the calculation of incident direction are performed as P4$_3$32 structure.

Among others, the "diffraction spot which is not observed in the Fd-3m structure" is preferably a diffraction spot which is observed in the P4$_3$32 structure. When the diffraction spot which is observed in the P4$_3$32 structure is confirmed, effects such as the expansion of the high potential capacity region and the suppression of gas generation can be further obtained. Therefore, the present 5 V class spinel is more preferably an oxide in which a diffraction spot which is observed in the P4$_3$32 structure is confirmed.

Incidentally, indexing of the diffraction spot and determination of crystal orientation can be performed according to a method described on page 27 of "lecture textbook for 20th electron microscopy college (edited and published by The Japanese Society of Microscopy, The Electron Microscopy College Planning Board et al.)".

The present 5 V class spinel may also have features that, in an electronic diffraction image from a transmission electron microscope (TEM), a diffraction spot which is observed in the P4$_3$32 structure is confirmed.

As a result of a number of tests performed by the inventors of the present invention, in regard to the 5 V class spinel comprising Li, Mn, O and two or more other elements and having features in which a diffraction spot which is observed in the P4$_3$32 structure is confirmed in an electronic diffraction image from a TEM, it has been found that a shoulder at near 4 V is disappeared, a plateau region at near 4.5 V is expanded, a high potential capacity region is expanded, and thus energy density is increased compared to the 5 V class spinel in which the diffraction spot which is not observed is confirmed. In addition, it has been found that gas generation can also be suppressed.

In any of the present 5 V class spinel, when the indexing of the diffraction spot and the calculation of incident direction are performed as the $P4_332$ structure, it is preferable that a diffraction spot of 011 is confirmed between diffraction spots of 000 and 022 in a diffraction image of incidence from crystal zone axis <100>.

As such, in an electronic diffraction image from a TEM, in order to produce the present 5 V class spinel in which the diffraction spot which is observed in the Fd-3m structure as well as the diffraction spot which is not observed in the Fd-3m structure are confirmed, or the present 5 V class spinel in which the diffraction spot which is observed in the $P4_332$ structure is confirmed, it is preferable to perform an oxygen-containing pressure heat treatment to a 5 V class spinel-type lithium manganese-containing composite oxide as an object to be treated as described later.

Among others, when the Raman spectroscopic analysis is performed according to a method described in the paragraph [0040] of JP-A No. 2014-110176, the present 5 V class spinel is more preferably a 5 V class spinel-type lithium manganese-containing composite oxide in which the number of peaks appeared in a range of 155 to 650 $cm^{-1}$ is not 11 peaks.

(Tap Density)

A tap density of the present 5 V class spinel is preferably 1.2 $g/cm^3$ or more, more preferably 1.3 $g/cm^3$ or more or 3.0 $g/cm^3$ or less, and even more preferably 1.5 $g/cm^3$ or more or 2.8 $g/cm^3$ or less.

When the tap density of the present 5 V class spinel is 1.2 $g/cm^3$ or more as described above, the electrode density can be enhanced, and thus the volumetric energy density can be enhanced.

In order to set the tap density of the present 5 V class spinel to 1.2 $g/cm^3$ or more, it is preferable to produce the present 5 V class spinel by calcining at a high temperature of 800° C. or more, adding a material which enhances the reactivity in calcination such as a boron compound and a fluorine compound, followed by calcining, or using a compact raw material. However, the production method is not limited to this method.

(Average Primary Particle Size)

An average primary particle size of the present 5 V class spinel is preferably more than 0.5 µm, more preferably 1.0 µm or more or 20 µm or less, even more preferably 2.0 µm or more or 15 µm or less, and even more preferably more than 6.0 µm.

When the average primary particle size of the present 5 V class spinel is 0.5 µm or more as described above, the contact area with an electrolyte can be reduced, and thus the amount of gas generation can be reduced.

In order to set the average primary particle size of the present 5 V class spinel to more than 0.5 µm, it is preferable to produce the present 5 V class spinel by calcining at a high temperature of 800° C. or more, or adding a material which enhances the reactivity in calcination such as a boron compound and a fluorine compound, followed by calcining. However, the production method is not limited to this method.

Meanwhile, the term "primary particles" as used in the present invention means particles of the smallest unit that are surrounded by grain boundaries when observed with a SEM (scanning electron microscope, for example, a magnification of 500 to 5,000 times). Unless particularly stated otherwise, the term "present spinel particles" mean primary particles.

Further, in regard to the average size of the primary particles, the "average size of primary particles" can be determined by observing with a SEM (scanning electron microscope, for example, a magnification of 500 to 5,000 times), selecting arbitrary 50 primary particles, calculating the average particle size of the selected primary particles using an image analysis software, and averaging the primary particle sizes of the 50 particles.

On the other hand, the term "secondary particles" used in the present invention means particles in which plural primary particles are aggregated so as to share portions of the outer peripheries (grain boundaries) of the respective particles, and are segregated from other particles.

The D50 value according to the volume-based particle size distribution which can be obtained via measurements by a laser diffraction scattering type particle size distribution measurement method, has a meaning as a substitute value of the average size of particles including these primary particles and secondary particles.

(Specific surface area)

A specific surface area (SSA) of the present 5 V class spinel is preferably 1.5 $m^2/g$ or less, more preferably 0.1 $m^2/g$ or more or 1.0 $m^2/g$ or less, and even more preferably 0.1 $m^2/g$ or more or 0.8 $m^2/g$ or less.

When the specific surface area is relatively small as described above, the reactivity-resistant with an electrolyte increases, and thus the amount of gas generation, which is the problem that the 5 V class spinel has characteristically, can be suppressed.

An example of the method in which the specific surface area (SSA) of the present 5 V class spine is set to 1.5 $m^2/g$ or less may be a method for performing a pressure heat treatment to a 5 V class spinel-type lithium manganese-containing composite oxide as an object to be treated.

(Crystallite Size)

A crystallite size of the present 5 V class spinel is preferably 100 nm or more.

When the crystallite size is 100 nm or more, the ion conductivity can be increased, and thus the output can be raised. In addition, polarization can be suppressed by increasing the output, and preventing the discharge capacity from gradually decreasing with the repetition of charging and discharging at high temperature is possible.

From such points of view, the crystallite size of the present 5 V class spinel is preferably 100 nm or more, more preferably 110 nm or more or 300 nm or less, even more preferably 120 nm or more or 250 nm or less, and even more preferably 130 nm or more or 200 nm or less.

Here, the term "crystallite" means a largest aggregation which can be regarded as a single crystal, and can be determined by XRD measurement and Rietveld analysis.

In order to adjust the crystallite size of the present 5 V class spinel to the above range, it is preferable to adjust a calcination temperature, a calcination time, a supporting agent which enhances reactivity, a calcination atmosphere, a raw material species, and the like.

<Method for Producing Present 5 V Class Spinel>

An example of the method for producing the present 5 V class spinel may be a production method having a pressure heat treatment step in an oxygen-containing atmosphere.

The method for producing the present 5 V class spinel may have a pressure heat treatment step in an oxygen-containing atmosphere, in which a spinel-type lithium manganese-containing composite oxide, or preferably a 5 V-class spinel-type lithium manganese-containing composite oxide is used as an object to be treated. In so doing, the spinel-type lithium manganese-containing composite oxide as an object to be treated may be produced from a raw material as described later, or an object which is produced by a method other than the production method of the present 5 V class spinel may be obtained and used as the object to be treated.

An example of the production method of the present 5 V class spinel may be a production method having a mixing step of raw materials, a calcination step, and a pressure heat treatment step in oxygen-containing atmosphere in this order, and further having a washing step.

At this time, the washing step can be inserted in an appropriate order. For example, the washing step can be inserted before the mixing step of raw materials, after the mixing step of raw materials, before the calcination step, after the calcination step, before the pressure heat treatment step in oxygen-containing atmosphere, or after the pressure heat treatment step in oxygen-containing atmosphere step. The washing step can also be performed more than once.

In addition, other steps can be added in addition to the above steps. For example, a wet pulverization step, a granulation step, heat treatment step, and other steps can be further added. Meanwhile, it is preferable to insert a crushing and classification step which crushes and classifies after the respective steps, if necessary.

(Raw Material)

Here, raw materials for producing a substance which contains a spinel-type lithium manganese-containing composite oxide represented by a formula (1): Li [Li$_a$Mn$_{2-a-b-c}$M1$_b$M2$_c$]O$_{4-\delta}$ or a formula (2): Li[Li$_a$Mn$_{2-a-b-c}$Ni$_b$M2$_c$]O$_{4-\delta}$ will be described.

However, since the present 5 V class spinel, which is the production object of the present invention, is not limited to the substance represented by the above formulae (1) and (2), the raw material can be appropriately changed.

Examples of the raw materials for producing a substance which contains a spinel-type lithium manganese-containing composite oxide represented by a formula (1): Li [Li$_a$Mn$_{2-a-b-c}$M1$_b$M2$_c$]O$_{4-\delta}$ or a formula (2) : Li [Li$_a$Mn$_{2-a-b-c}$Ni$_b$M2$_c$]O$_{4-\delta}$ include lithium raw materials, manganese raw materials, M1 metal raw materials, M2 metal raw materials, and other raw materials such as boron raw materials.

Examples of lithium raw materials include lithium hydroxide (LiOH), lithium carbonate (Li$_2$CO$_3$), lithium nitrate (LiNO$_3$), LiOH.H$_2$O, lithium oxide (Li$_2$O), and besides, fatty acid lithium and lithium halides.

Examples of manganese raw materials include manganese carbonate, manganese nitrate, manganese chloride, manganese dioxide, dimanganese trioxide, and trimanganese tetroxide. Among others, manganese carbonate and manganese dioxide are preferable, and electrolytic manganese dioxide that is obtained by an electrolytic method is more preferable.

Examples of the M1 metal raw materials and the M2 metal raw materials include carbonate, nitrate, chloride, oxyhydroxide salt, and hydroxide of M1 or M2 metal.

In addition, a boron compound may be blended into the raw material.

The boron compound may be a compound containing boron (element B), and for example, it is preferable to use boric acid or a lithium borate. As lithium borate, various forms thereof, for example, lithium metaborate (LiBO$_2$), lithium tetraborate (Li$_2$B$_4$O$_7$), lithium pentaborate (LiB$_5$O$_8$) and lithium perborate (Li$_2$B$_2$O$_5$) can be used.

When such boron compound is blended, the composite oxide phase containing Ni, Mn and B, for example, a crystal phase of Ni$_5$MnO$_4$(BO$_3$)$_2$ may occur, in addition to the crystal phase of the present 5 V class spinel.

(Washing Step)

An object to be treated that is subjected to the washing step may be, for example, each of the raw materials before mixing of the raw materials, a raw material mixed powder after mixing of the raw materials, a treated powder after pressure heat treating in oxygen-containing atmosphere, a treated object obtained from a calcination step, and further a treated powder obtained from a crushing and classification step as described later. One or two or more kinds of these may be washed.

In the washing step, it is preferable to bring an object to be treated (powder) into contact with a polar solvent, and to wash the powder so as to separate impurities contained in the powder.

For example, the object to be treated (powder) and a polar solvent are mixed and stirred to obtain a slurry, and the slurry thus obtained may be subjected to solid-liquid separation by filtration or the like, so as to eliminate impurities. At this time, the solid-liquid separation may be performed at a subsequent step.

Meanwhile, the term slurry means a state in which the treated powder is dispersed in a polar solvent.

For the polar solvent that is used for washing, water is preferably used.

Water may be tap water, but it is preferable to use ion-exchanged water or pure water that has been passed through a filter or a wet type magnetic separator.

The pH of water is preferably 4 to 10, and among others, the pH is more preferably 5 or more or 9 or less.

In regard to the liquid temperature at the time of washing, it has been confirmed that if the liquid temperature at the time of washing is low, the battery characteristics become more satisfactory. Therefore, from such a point of view, the liquid temperature is preferably 5° C. to 70° C., and among others, more preferably 60° C. or less, and even more preferably 45° C. or less. Also, the liquid temperature is further more preferably 30° C. or less.

The reason why the battery characteristics become more satisfactory when the liquid temperature at the time of washing is low, is considered that when the liquid temperature is too high, lithium in the lithium manganese-containing composite oxide is ion-exchanged with protons of the ion-exchanged water, thereby lithium is removed, which affects high temperature characteristics.

In regard to the amount of the polar solvent that is brought into contact with the object to be treated (powder), it is preferable to adjust the mass ratio of the lithium manganese-containing composite oxide with respect to the polar solvent (also referred to as "slurry concentration") to 10 to 70 wt %, more preferably 20 wt % or more or 60 wt % or less, and even more preferably 30 wt % or more or 50 wt % or less. When the amount of the polar solvent is 10 wt % or more, impurities such as SO$_4$ are easily eluted, and on the contrary, when the amount of the polar solvent is 60 wt % or less, a washing effect adequate for the amount of the polar solvent can be obtained.

Meanwhile, in case of washing each of the raw materials before mixing of the raw materials and the raw material mixed powder after mixing of the raw materials, a method in which each of the raw materials or the raw material mixed powder is introduced into a washing liquid, followed by stirred, left to stand and then a supernatant is removed, may be employed.

In addition, when a treated object obtained from a calcination step, that is, a spinel-type lithium manganese-containing composite oxide is washed, it may be introduced into a washing liquid, followed by stirred, left to stand and then a supernatant may be removed. For example, a spinel-type lithium manganese-containing composite oxide is introduced into a washing liquid, stirred for 20 minutes, and left to stand for 10 minutes. Thereafter, it is preferable to remove a spinel-type lithium manganese-containing composite oxide contained in a supernatant. By washing as described above, the amount of impurities in the spinel-type lithium manganese-containing composite oxide, for example, the sulfur content can be decreased.

Further, when a treated object after pressure heat treating in oxygen-containing atmosphere is washed, a spinel-type lithium manganese-containing composite oxide obtained by pressure heat treating in oxygen-containing atmosphere may be introduced into a washing liquid, followed by stirred, left to stand and then a supernatant may be removed. For example, a spinel-type lithium manganese-containing composite oxide is introduced into a washing liquid, stirred for 20 minutes, and left to stand for 10 minutes. Thereafter, it is preferable to remove a spinel-type lithium manganese-containing composite oxide contained in a supernatant.

(Mixing Step of Raw Materials)

The method of mixing the raw materials is not especially limited as long as the raw materials can be uniformly mixed. For example, the respective raw materials may be added simultaneously or in an appropriate order, and may be stirred and mixed in a wet mode or a dry mode, using a known mixing machine such as a mixer, to serve as a raw material mixed powder. When an element that is not easily substitutable, for example, aluminum, is added, it is preferable to employ wet mixing.

As dry mixing, for example, a mixing method using a precision mixing machine which rotates the raw material mixed powder at a high speed can be exemplified.

On the other hand, as wet mixing, a method of adding the raw material mixed powder to a liquid medium such as water or a dispersant, and performing wet mixing to obtain slurry, can be cited.

(Wet Pulverization Step)

In the wet pulverization step, the raw material is pulverized by introducing into a liquid medium such as water. The wet pulverization may be performed before mixing the raw materials, or may also be performed after mixing the raw materials.

In the case of performing the wet pulverization after mixing the raw materials, the raw material mixed powder is added to a liquid medium such as water or a dispersant, and is wet mixed to obtain slurry as described above, and then the obtained slurry may be pulverized using a wet pulverizing machine. At this time, it is particularly preferable to pulverize the slurry to submicron order. By granulating and calcining the obtained slurry after pulverizing to submicron order, the uniformity of the respective particles before the calcination reaction can be increased, and the reactivity can be raised.

Meanwhile, in the case of performing the wet pulverization before mixing the raw materials, the respective raw materials may be wet pulverized respectively and mixed. Thereafter, the resultant materials may be further wet pulverized if necessary.

In the case of pulverizing the respective raw materials respectively, in order to enhance the homogeneity in raw material mixing, it is preferable to pulverize a raw material having a large Dmax in advance before the raw materials are mixed. For example, it is preferable that a nickel compound, if necessary a nickel compound and a manganese compound are pulverized and classified to adjust such that the maximum particle diameter (Dmax) of the nickel compound and the manganese compound becomes 10 μm or less, more preferably 5 μm or less, and even more preferably 4 μm or less.

(Granulation Step)

It is preferable that the raw materials mixed as described above are calcined after being granulated to a predetermined size, if necessary. However, granulation may not be necessarily performed.

A granulation method may be a wet-type method or a dry-type method as long as various raw materials that are pulverized in the previous step are dispersed in a granulated particle, and may be an extrusion granulation method, a rolling granulation method, a fluidized bed granulation method, a mixing granulation method, a spray drying granulation method, a pressure molding granulation method, or a flake granulation method using a roll or the like. However, in the case of performing the wet-type granulation, sufficient drying before the calcination is needed.

Examples of a drying method include known drying methods such as a spray thermal drying method, a hot-air drying method, a vacuum drying method, and a freeze-drying method, and among others, the spray thermal drying method is preferable. The thermal spray drying method is preferably performed using a thermal spray drying machine (spray dryer). When the granulation is performed using the thermal spray drying machine (spray dryer), a particle size distribution can be sharper, and a configuration of secondary particles can be prepared so as to include aggregated particles (secondary particles) that are aggregated in a round shape.

(Calcination Step)

In the calcination step, it is preferable to calcine under an atmosphere in which an oxygen partial pressure is 0.015 to 0.15 MPa, for example, under an air atmosphere.

When the oxygen partial pressure is more than 0.15 MPa, the crystal growth cannot be promoted, and thus the crystallite size cannot be made large. Further, as described later, in order to promote the crystal growth by calcination, the oxygen partial pressure of the atmosphere is preferably low. However, when the oxygen partial pressure at the time of calcining is too low, oxygen deficiency is increased, and the strain cannot be recovered even by the heat treatment. Therefore, it is preferable to calcine at an oxygen partial pressure of 0.015 MPa or more.

From such points of view, the oxygen partial pressure in calcination is more preferably 0.015 to 0.13 MPa, even more preferably 0.015 to 0.12 MPa, further more preferably 0.015 MPa or more or less than 0.08 MPa, and particularly preferably 0.015 MPa or more or less than 0.061 MPa.

In regard to a calcination temperature, since a specific surface area can be lowered by calcining at high temperature, it is preferable to calcine at a temperature of 770° C. or more, more preferably 800° C. or more, and even more preferably 850° C. or more. However, when the calcination temperature is too high, there is a possibility that oxygen deficiency is increased, and the strain cannot be recovered even by the heat treatment. Therefore, it is preferable to calcine at a temperature of 1,000° C. or less, and more preferably 980° C. or less.

Meanwhile, this calcination temperature means a temperature of a calcined product measured by bringing a thermocouple into contact with the calcined product inside a calcination furnace.

A calcination time, that is, a time for maintaining the calcination temperature, may vary with the calcination temperature, but it may be 0.5 hours to 100 hours.

The kind of the calcination furnace is not particularly limited. The calcination can be performed using, for example, a rotary kiln, a stationary furnace, or other calcination furnaces.

Meanwhile, in a case of coexisting materials which enhance the reactivity in calcination such as a boron compound and a fluorine compound, a specific surface area can be lowered even at low temperature. In such a case, it is preferable to calcine at a calcination temperature of 770° C. or more, more preferably 800° C. or more, and even more preferably 850° C. or more. However, when the calcination temperature is too high, there is a possibility that oxygen deficiency is increased, and the strain cannot be recovered even by the heat treatment. Therefore, it is preferable to calcine at a temperature of 980° C. or less, and more preferably 960° C. or less.

Meanwhile, when the materials which enhance the reactivity in calcination as described above are not coexisted, it is preferable to calcine at a temperature of 800° C. or more, more preferably 840° C. or more, and even more preferably 880° C. or more. However, when the calcination temperature is too high, there is a possibility that oxygen deficiency is increased, and the strain cannot be recovered even by the heat treatment. Therefore, it is preferable to calcine at a temperature of 1,000° C. or less, and more preferably 980° C. or less.

(Pressure Heat Treatment Step in Oxygen-Containing Atmosphere)

An object to be treated that is subjected to the pressure heat treatment step in oxygen-containing atmosphere is preferably a spinel-type lithium manganese-containing composite oxide, in which the "moisture in a range of room temperature to 300° C. (referred to as "KF moisture")", which is measured using a Karl Fischer moisture measuring apparatus (also referred to as "KF moisture measuring apparatus"), is 2% or less, and the sulfur content, which is analyzed by ICP, is less than 0.34 wt %.

When the KF moisture is more than 2%, a large amount of steam is contained in a pressurized furnace atmosphere under oxygen-containing atmosphere, and thus there is a possibility that a desired heat treatment atmosphere cannot be provided. Further, by performing a heat treatment in a state of containing a large amount of moisture, there is a possibility that side reactions such as a proton exchange between surface moisture and Li of 5 V class spinel are occurred.

From such points of view, the KF moisture is preferably 1% or less, more preferably less than 5,000 ppm, even more preferably 2,000 ppm or less, and further more preferably 1,000 ppm or less.

Meanwhile, when the sulfur content is 0.34 wt % or more, a large amount of sulfate such as $Na_2SO_4$ and $Li_2SO_4$ is present, and thus there is a possibility that an effect of the heat treatment is prevented. From such point of view, the sulfur content is preferably less than 0.34 wt %, and more preferably less than 0.28 wt %.

A spinel-type lithium manganese-containing composite oxide having the KF moisture and the sulfur content as described above can be obtained by adjusting, for example, conditions of a calcination step and a washing step. For example, it is possible to set the sulfur content to less than 0.34 wt % by calcining raw materials before mixing at a high temperature of 600° C. or more, washing the raw materials before mixing, and washing a treated object obtained from a calcination step, that is, a spinel-type lithium manganese-containing composite oxide. Meanwhile, for example, it is possible to set the KF moisture by calcining at a high temperature of 800° C. or more in a calcination step.

Incidentally, the "KF moisture in a range of room temperature to 300° C." which is measured using a KF moisture measuring apparatus can be obtained by the following procedures: a sample is put in a measurement chamber of the KF moisture measuring apparatus after heating inside of the measurement chamber to 170° C. as a nitrogen atmosphere; an amount of moisture released when the sample is left to stand at 170° C. for 45 minutes is measured to obtain a "KF moisture (ppm) in a range of room temperature to 170° C"; subsequently, the temperature is increased to 300° C. and an amount of moisture released when the sample is left to stand at 300° C. for 45 minutes is measured to obtain a "KF moisture (ppm) in a range of 170° C. to 300° C"; the "KF moisture (ppm) in a range of room temperature to 170° C." and the "KF moisture (ppm) in a range of 170° C. to 300° C." are summed.

In regard to the pressure heat treatment step in an oxygen-containing atmosphere, it is preferable to perform a heat treatment at a temperature of more than 500° C. and less than 850° C. in the treatment atmosphere in which an overall pressure of the treatment atmosphere is higher than air pressure, and an oxygen partial pressure of the atmosphere is higher than an oxygen partial pressure of air pressure.

By performing the pressure heat treatment in an oxygen-containing atmosphere as described above, oxygen is introduced into the structure of the present 5 V-class spinel, and thus oxygen deficiency is decreased and the structure is stabilized. Therefore, even in a case of calcining at high temperature as described above, it can be considered that a plateau region at near 4.5 V can be expanded, a high potential capacity region can be expanded, and thus energy density can be increased.

Incidentally, the pressure atmosphere which is higher than air pressure includes a case in which the pressure is higher than air pressure by heating an inside of sealed container such that the pressure is increased by rising a temperature of gas in a certain volume.

In the treatment atmosphere of the pressure heat treatment step in an oxygen-containing atmosphere, it is preferable that the overall pressure of the treatment atmosphere is a pressure which is higher than air pressure (0.1 MPa), for example, more than 0.19 MPa, and more preferably 0.20 MPa or more. However, when the pressure of the treatment atmosphere is too high, there is a possibility that the production becomes unstable due to a problem on strength of the pressurized furnace. Therefore, from such point of view, the heat treatment is preferably performed at an atmosphere pressure of 1.5 MPa or less, and more preferably 1.0 MPa or less. As such, by performing the heat treatment in a state of pressuring in an oxygen-containing atmosphere, oxygen is more easily introduced, and thus the oxygen deficiency can be further suppressed. From such point of view, it is preferable to control the pressure in the atmosphere during the pressure heat treatment in an oxygen-containing atmosphere to 1.5 MPa or less, which is higher than 0.19 MPa, more preferably 0.20 MPa or more or 1.3 MPa or less, and even more preferably 1.0 MPa or less.

Further, in the treatment atmosphere of the pressure atmosphere, it is preferable that the oxygen partial pressure is, for example, higher than 0.19 MPa, and more preferably 0.20 MPa or more. However, when the oxygen partial pressure is too high, there is a possibility that the production becomes unstable due to a problem on strength of the pressurized furnace. Therefore, from such point of view, the heat treatment is preferably performed under an oxygen partial pressure of 1.5 MPa or less, and more preferably 1.0 MPa or less.

From such point of view, it is preferable to control the oxygen partial pressure during the pressure heat treatment in an oxygen-containing atmosphere to 1.5 MPa or less, which is higher than 0.19 MPa, more preferably 0.20 MPa or more or 1.3 MPa or less, and even more preferably 1.0 MPa or less.

It is preferable to control a heat treatment temperature, that is, a retention temperature in the pressure heat treatment step in an oxygen-containing atmosphere to a temperature of more than 500° C. and less than 850° C.

When the heat treatment temperature in the present step is higher than 500° C., the heat treatment is performed while forcibly supplying oxygen, and thus the strain can be effectively decreased by introducing oxygen into a crystal structure. From such point of view, the heat treatment temperature is preferably a temperature of more than 500° C., more preferably 600° C. or more, even more preferably 700° C. or more, and even more preferably more than 700° C.

Meanwhile, when the heat treatment temperature is too high, there is a possibility that oxygen deficiency is increased, and the strain cannot be recovered even by the heat treatment. Therefore, the heat treatment temperature is preferably a temperature of less than 850° C., more preferably 820° C. or less, and even more preferably 800° C. or less.

Incidentally, this heat treatment temperature means a product temperature of the treated object which is measured by bringing a thermocouple into contact with the treated object in the furnace.

An example of the preferred conditions of the pressure heat treatment in an oxygen-containing atmosphere may be a condition in which an overall pressure of the treatment atmosphere is higher than air pressure, an oxygen partial pressure is higher than 0.19 MPa, and the pressure heat treatment in an oxygen-containing atmosphere is performed at a temperature of more than 500° C. and less than 850° C., among others, 600° C. or more or less than 850° C., and still among others, more than 700° C. or 800° C. or less.

It is preferable that a temperature-rise rate when heating to the heat treatment temperature, that is, the retention temperature is 0.1 to 20° C./min, more preferably 0.25° C./min or more or 10° C./min or less, and even more preferably 0.5° C./min or more or 5° C./min or less.

It is necessary that the retention time of the heat treatment temperature in the pressure heat treatment step in an oxygen-containing atmosphere is at least one minute or more. In order to introduce oxygen into a crystal structure sufficiently, it is considered that at least one minute is necessary. From such point of view, the retention time of the heat treatment temperature is preferably 5 minutes or more, and more preferably 10 minutes or more. Further, it is considered that when the retention time is 200 hours or less, an effect in which oxygen is introduced into a crystal structure is sufficiently obtained.

In regard to a temperature-fall rate after heat treatment, it is preferable to cool slowly at a cooling rate of 10° C./min or less at least to 500° C., and it is more preferable to control the cooling rate of 0.1 to 8° C./min, and even more preferably 0.2 to 5° C./min.

Since it is considered that the oxygen thus introduced is stabilized at near 500° C., it can be considered that it is preferable to cool slowly at a temperature-fall rate of 10° C./min or less at least to 500° C.

The pressure heat treatment in an oxygen-containing atmosphere as described above can be performed by heating using an apparatus such as a pressurized furnace (pressurizable pressure is 1.0 MPa) at an atmosphere in which an overall pressure of the treatment atmosphere is higher than air pressure, and an oxygen partial pressure of the atmosphere is higher than an oxygen partial pressure of air pressure.

(Other)

The washing step as described later can be inserted before, or after, or before and after the pressure heat treatment step in oxygen-containing atmosphere.

<Other Embodiments>

Another example of the production method of the present 5 V class spinel may be a production method comprising a mixing step of raw materials, a granulation step, a calcination step, a heat treatment step, and a pressure heat treatment step in oxygen-containing atmosphere in this order, and further comprising a washing step additionally.

At this time, the washing step can be inserted in an appropriate order. For example, the washing step can be inserted before or after one kind or two or more kinds of these steps.

One kind or two or more kinds of any of the granulation step, heat treatment step, and the washing step can also be omitted. In addition, other steps can also be added. For example, a wet pulverization step and other steps can be further added. Meanwhile, it is preferable to insert a crushing and classification step which crushes and classifies after the respective steps, if necessary.

The mixing step of raw materials, the wet pulverization step, the granulation step, the calcination step, the pressure heat treatment step in oxygen-containing atmosphere, and washing step are performed in the same manner as the above, respectively.

(Heat Treatment Step)

For the heat treatment step, it is preferable to facilitate introduction of oxygen by placing the substance for 0.5 to 300 hours, under an air atmosphere, in an environment at 500° C. to 850° C., and preferably at 600° C. or more or 800° C. or less.

(Crushing and Classification Step)

After the heat treatment step, it is preferable to crush or pulverize the substance, if necessary.

In so doing, the degree of crushing is preferably performed such that the primary particles should not be disintegrated.

Then, it is preferable to classify the substance after the crushing.

<Application of present 5 V class spinel>The present 5 V class spinel can be effectively used as a positive electrode active material for various lithium batteries after being crushed and classified as necessary.

In a case of using the present 5 V class spinel as a positive electrode active material for various lithium batteries, a positive electrode mixture can be produced by mixing, for example, the present 5 V class spinel, a conductive material formed from carbon black or the like, and a binder formed from a TEFLON (registered trademark) binder or the like. Then, a lithium battery can be constituted by using such a positive electrode mixture as a positive electrode, using lithium or a material capable of intercalating and de-intercalating lithium, such as carbon, as a negative electrode, and using a solution in which a lithium salt such as lithium hexafluorophosphate $LiPF_6$) is dissolved in a mixed solvent such as ethylene carbonate-dimethyl carbonate as a non-aqueous electrolyte.

A lithium battery constituted in this manner can be used, for example, in electronic devices such as laptop computers, mobile phones, cordless telephone handsets, video movies, liquid crystal televisions, electric shavers, portable radios, headphone stereos, backup power supplies, and memory cards, medical devices such as pacemakers and hearing aids, and driving power supplies for being mounted in electric vehicles. Among others, the lithium battery is particularly effective as various kinds of portable computers such as mobile phones, PDAs (portable information terminals), and laptop computers, electric vehicles (including hybrid vehicles), and driving power supplies for electric power storage, which require excellent cycle characteristics.

<Determination Method>

As a method for determining whether or not a spinel-type lithium manganese-containing composite oxide which is incorporated and used in a battery is the 5 V class spinel of the present invention, that is, the spinel-type lithium manganese-containing composite oxide having an operating potential of 4.5 V or more at a metal Li reference potential, wherein, in an electronic diffraction image from a transmission electron microscope (TEM), a diffraction spot which is observed in Fd-3m structure as well as a diffraction spot which is not observed in the Fd-3m structure are confirmed, it can be determined by the following method. However, this method is merely an example, and the determination method is not limited to this method.

First, the obtained battery is discharged until the capacity thereof runs out. After discharging, the battery is put in a glove box, and is disassembled while being careful of not short-circuiting. After disassembling, the positive electrode thus taken out is immersed into diethyl carbonate for 10 minutes. Subsequently, a vacuum drying is performed for 10 minutes to obtain the positive electrode. In the obtained positive electrode, a positive electrode mixture layer is peeled off from an Al foil which serves as a current collector to obtain a positive electrode mixture. This positive electrode mixture contains a positive electrode active material, a conductor, a binder, and the like.

Next, for the purpose of eliminating the conductor, the binder, and the like from the obtained positive electrode mixture, a heat treatment is performed for maintaining a temperature of 610° C. at a stationary batch furnace for 5 hours, thereby obtaining a measurement sample.

Then, the obtained measurement sample can be determined by observing an electronic diffraction image from a transmission electron microscope (TEM) in the same manner as Examples which will be described later.

<Description of Terms>

When the expression "X to Y" (wherein X and Y are arbitrary numbers) is used in the present specification, unless particularly stated otherwise, the expression includes the meaning of "X or more and Y or less", as well as the meaning of "preferably more than X" or "preferably less than Y".

Furthermore, when the expression "X or more" (wherein X is an arbitrary number) or "Y or less" (wherein Y is an arbitrary number) is used, the expression also includes the meaning of "more than X is preferable" or "less than Y is preferable".

EXAMPLES

Next, the present invention will be described further based on Examples and Comparative Examples. However, the present invention is not limited to the following Examples.

Example 1

Lithium carbonate having an average particle diameter (D50) of 7 μm, electrolytic manganese dioxide having an average particle diameter (D50) of 23 μm and a specific surface area of 40 $m^2/g$, nickel hydroxide having an average particle diameter (D50) of 22 μm, and titanium oxide having an average particle diameter (D50) of 2 μm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to the total amount of the Li raw material, the Ni raw material, the Mn raw material, and the Ti raw material, and the dispersant was sufficiently dissolved in and mixed with the ion-exchanged water. Among the raw materials that had been weighed, only the Ni raw material and the Mn raw material were added to the ion-exchanged water, in which the dispersant was dissolved in advance, and the resultant mixture was mixed and stirred to obtain a slurry. The obtained slurry was pulverized using a wet pulverizing machine at 1,300 rpm for 120 minutes. Subsequently, the Li raw material and the Ti raw material were added thereto, and the resultant mixture was mixed and stirred to prepare a slurry having a solid content concentration of 40 wt %. Further, the slurry was pulverized using a wet pulverizing machine at 1,300 rpm for 60 minutes, thereby obtaining a pulverized slurry having an average particle diameter (D50) of 0.60 μm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying was performed under conditions in which a spray pressure was set to 0.15 MPa, a slurry supply amount was set to 400 ml/min, and a temperature was adjusted such that an outlet temperature of a drying tower became 100 to 110° C.

The obtained granulated powder was calcined, using a stationary electric furnace, under an atmosphere in which an oxygen partial pressure is 0.021 MPa so as to maintain a temperature of 950° C. for 37 hours, and then was heat treated under an atmosphere in which an oxygen partial pressure is 0.021 MPa so as to maintain maintaining a temperature of 750° C. for 37 hours.

The calcined powder obtained by the heat treatment was put in a mortar and was crushed using a pestle, and the resultant crushed powder was classified using a sieve having an aperture of 53 μm, and the powder under the sieve was collected to obtain a spinel-type lithium manganese-containing composite oxide powder.

Next, 1 kg of the spinel-type lithium manganese-containing composite oxide powder that was obtained by collecting the powder under the sieve was introduced into a plastic beaker (capacity of 5,000 mL) which was filled with ion-exchanged water having a pH of 6 to 7, a temperature of 25° C., and a volume of 2,000 mL, and the content was stirred using a stirrer (propeller area of 33 $cm^2$) at a rotation speed of 400 to 550 rpm for 20 minutes. After stirring, stirring was stopped, the stirrer was taken out from the water, and the resultant stirred sample was left to stand for 10 minutes. Then, the supernatant was removed by decantation, the residual was recovered as a precipitate using a suction filtration machine (filter paper No. 131), and the precipitate thus recovered was dried in an environment of 120° C. for 12 hours. Thereafter, the resultant sample was dried for 7 hours in a state of being heated so as to have the product temperature of 500° C. After drying, the resultant dried sample was classified using a sieve having an aperture of 53 µm, and the powder under the sieve was collected to obtain a spinel-type lithium manganese-containing composite oxide powder (KF moisture: 128 ppm, sulfur content: 0.02%).

Further, this spinel-type lithium manganese-containing composite oxide powder was pressure heat treated in oxygen-containing atmosphere using a pressurized furnace (manufactured by Hirochiku Co., Ltd.). That is, 200 g of the spinel-type lithium manganese-containing composite oxide powder was filled in a ceramic crucible, and the ceramic crucible was placed inside the pressurized furnace. Thereafter, oxygen gas (oxygen concentration of 99%) was flowed into the pressurized furnace to adjust an oxygen partial pressure to 0.20 MPa and an overall pressure of the treatment atmosphere to 0.21 MPa, and then the ceramic crucible was heated at a temperature-rise rate of 1.7° C./min up to 730° C. and maintained for 15 hours, and thereafter cooled at a temperature-fall rate of 0.3° C./min down to room temperature while continuing oxygen inflow, thereby obtaining a spinel-type lithium manganese-containing composite oxide powder (sample).

Chemical analysis was performed with respect to the spinel-type lithium manganese-containing composite oxide powder (sample), and as a result, the components were Li: 4.2 wt %, Ni: 13.2 wt %, Mn: 41.6 wt %, and Ti: 5.0 wt %.

Incidentally, oxygen concentration was measured using an oxygen concentration meter (XPO-318 (New Cosmos Electric Co., Ltd.)). The same applies to Examples and Comparative Examples that will be described later.

Further, temperatures in the calcination and in the heat treatment are product temperatures of the treated object which are measured by bringing a thermocouple into contact with the treated object in the furnace. The same applies to Examples and Comparative Examples that will be described later.

Example 2

A spinel-type lithium manganese-containing composite oxide powder (sample) was obtained in the same manner as Example 1 except that, in Example 1, the weighed values of the raw materials were changed, and the product under the sieve having an aperture of 53 µm that was obtained after performing the calcination followed by the heat treatment, was further crushed using a high speed rotary pulverizing machine (Pin Mil, manufactured by Makino Manufacturing Co., Ltd.)(crushing condition: revolution number of 7,000 rpm).

Chemical analysis was performed with respect to the spinel-type lithium manganese-containing composite oxide powder (sample) obtained in Example 2, and as a result, the components were Li: 4.1 wt %, Ni: 13.6 wt %, Mn: 41.7 wt %, and Ti: 5.4 wt %.

Example 3

Lithium carbonate having an average particle diameter (D50) of 7 µm, electrolytic manganese dioxide having an average particle diameter (D50) of 23 µm and a specific surface area of 40 m$^2$/g, nickel hydroxide having an average particle diameter (D50) of 22 µm, titanium oxide having an average particle diameter (D50) of 2 µm, and lithium tetraborate having an average particle diameter (D50) of 60 µm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to the total amount of the Li raw material, the Ni raw material, the Mn raw material, the Ti raw material, and the B raw material, and the dispersant was sufficiently dissolved in and mixed with the ion-exchanged water. Among the raw materials that had been weighed, only the Ni raw material and the Mn raw material were added to the ion-exchanged water, in which the dispersant was dissolved in advance, and the resultant mixture was mixed and stirred to obtain a slurry. The obtained slurry was pulverized using a wet pulverizing machine at 1,300 rpm for 120 minutes. Subsequently, the Li raw material, the Ti raw material, and the B raw material were added thereto, and the resultant mixture was mixed and stirred to prepare a slurry having a solid content concentration of 40 wt %. Further, the slurry was pulverized using a wet pulverizing machine at 1,300 rpm for 120 minutes, thereby obtaining a pulverized slurry having an average particle diameter (D50) of 0.60 µm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying was performed under conditions in which a spray pressure was set to 0.15 MPa, a slurry supply amount was set to 400 ml/min, and a temperature was adjusted such that an outlet temperature of a drying tower became 100 to 110° C.

The obtained granulated powder was calcined, using a stationary electric furnace, under an atmosphere in which an oxygen partial pressure is 0.021 MPa so as to maintain a temperature of 940° C. for 37 hours, and then was heat treated under an atmosphere in which an oxygen partial pressure is 0.021 MPa so as to maintain a temperature of 750° C. for 37 hours.

The calcined powder obtained by the heat treatment was put in a mortar and was crushed using a pestle, and the resultant crushed powder was classified using a sieve having an aperture of 53 µm, and the powder under the sieve was collected to obtain a spinel-type lithium manganese-containing composite oxide powder.

Next, 1 kg of the spinel-type lithium manganese-containing composite oxide powder that was obtained by collecting the powder under the sieve was introduced into a plastic beaker (capacity of 5,000 mL) which was filled with ion-exchanged water having a pH of 6 to 7, a temperature of 25° C., and a volume of 2,000 mL, and the content was stirred using a stirrer (propeller area of 33 cm$^2$) at a rotation speed of 400 to 550 rpm for 20 minutes. After stirring, stirring was stopped, the stirrer was taken out from the water, and the resultant stirred sample was left to stand for 10 minutes. Then, the supernatant was removed by decantation, the residual was recovered as a precipitate using a suction filtration machine (filter paper No. 131), and the precipitate thus recovered was dried in an environment of 120° C. for 12 hours. Thereafter, the resultant sample was dried for 7 hours in a state of being heated so as to have the product temperature of 500° C. After drying, the resultant dried sample was classified using a sieve having an aperture of 53 µm, and the powder under the sieve was collected to obtain a spinel-type lithium manganese-containing composite oxide powder (KF moisture: 110 ppm, sulfur content: 0.03%).

Further, this spinel-type lithium manganese-containing composite oxide powder was pressure heat treated using a pressurized furnace (manufactured by Hirochiku Co., Ltd.). That is, 200 g of the spinel-type lithium manganese-containing composite oxide powder was filled in a ceramic crucible, and the ceramic crucible was placed inside the pressurized furnace. Thereafter, oxygen gas (oxygen concentration of 99%) was flowed into the pressurized furnace to adjust an oxygen partial pressure to 0.20 MPa and an overall pressure of the treatment atmosphere to 0.21 MPa, and then the ceramic crucible was heated at a temperature-rise rate of 1.7° C./min up to 730° C. and maintained for 15 hours, and thereafter cooled at a temperature-fall rate of 0.3° C./min down to room temperature while continuing oxygen inflow, thereby obtaining a spinel-type lithium manganese-containing composite oxide powder (sample).

Chemical analysis was performed with respect to the spinel-type lithium manganese-containing composite oxide powder (sample) obtained in Example 3, and as a result, the components were Li: 4.0 wt %, Ni: 15.8 wt %, Mn: 40.9 wt %, Ti: 4.8 wt %, and B: 0.1 wt %.

Example 4

A spinel-type lithium manganese-containing composite oxide powder (sample) was obtained in the same manner as Example 3 except that, in Example 3, Lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 2 μm, aluminum hydroxide having an average particle diameter (D50) of 2 μm, and lithium tetraborate having an average particle diameter (D50) of 60 μm were used as a raw material, the weighed values of the raw materials were changed, the Al raw material was added to the ion-exchanged water, in which the dispersant was dissolved in advance, at the same time when the Mn raw material and the Ni raw material were added, and the resultant mixture was mixed and stirred.

Chemical analysis was performed with respect to the spinel-type lithium manganese-containing composite oxide powder (sample) obtained in Example 4, and as a result, the components were Li: 4.0 wt %, Ni: 15.9 wt %, Mn: 40.7 wt %, Ti: 4.9 wt o, Al: 0.1 wt o, and B: 0.1 wt %.

Example 5

Lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, and titanium oxide having an average particle diameter (D50) of 1 μm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to the total amount of the Li raw material, the Ni raw material, the Mn raw material, and the Ti raw material, and the dispersant was sufficiently dissolved in and mixed with the ion-exchanged water. Next, the raw materials that had been weighed were added thereto, and the resultant mixture was mixed and stirred to prepare a slurry having a solid content concentration of 40 wt %. Further, the slurry was pulverized using a wet pulverizing machine at 1,300 rpm for 60 minutes, thereby obtaining a pulverized slurry having an average particle diameter (D50) of 0.60 μm or less.

The pulverized slurry thus obtained was granulated and dried using a thermal spray dryer (Spray Dryer "RL-10", manufactured by Ohkawara Kakohki Co., Ltd.). In so doing, a twin jet nozzle was used for spraying, and the granulation and drying was performed under conditions in which a spray pressure was set to 0.45 MPa, a slurry supply amount was set to 336 ml/min, and a temperature was adjusted such that an outlet temperature of a drying tower became 100 to 110° C.

The obtained granulated powder was calcined, using a stationary electric furnace, under an atmosphere in which an oxygen partial pressure is 0.021 MPa so as to maintain a temperature of 880° C. for 22 hours, and then was heat treated under an atmosphere in which an oxygen partial pressure is 0.021 MPa so as to maintain a temperature of 740° C. for 37 hours.

The calcined powder obtained by the heat treatment was put in a mortar and was crushed using a pestle, and the resultant crushed powder was classified using a sieve having an aperture of 53 μm, and the powder under the sieve was collected to obtain a spinel-type lithium manganese-containing composite oxide powder.

Next, 1 kg of the spinel-type lithium manganese-containing composite oxide powder that was obtained by collecting the powder under the sieve was introduced into a plastic beaker (capacity of 5,000 mL) which was filled with ion-exchanged water having a pH of 6 to 7, a temperature of 25° C., and a volume of 2,000 mL, and the content was stirred using a stirrer (propeller area of 33 cm$^2$) at a rotation speed of 400 to 550 rpm for 20 minutes. After stirring, stirring was stopped, the stirrer was taken out from the water, and the resultant stirred sample was left to stand for 10 minutes. Then, the supernatant was removed by decantation, the residual was recovered as a precipitate using a suction filtration machine (filter paper No. 131), and the precipitate thus recovered was dried in an environment of 120° C. for 12 hours. Thereafter, the resultant sample was dried for 7 hours in a state of being heated so as to have the product temperature of 500° C. After drying, the resultant dried sample was classified using a sieve having an aperture of 53 μm, and the powder under the sieve was collected to obtain a spinel-type lithium manganese-containing composite oxide powder.

Further, this spinel-type lithium manganese-containing composite oxide powder was pressure heat treated in oxygen-containing atmosphere using a pressurized furnace (manufactured by Hirochiku Co., Ltd.). That is, 200 g of the spinel-type lithium manganese-containing composite oxide powder was filled in a ceramic crucible, and the ceramic crucible was placed inside the pressurized furnace. Thereafter, oxygen gas (oxygen concentration of 99%) was flowed into the pressurized furnace to adjust an oxygen partial pressure to 0.20 MPa and an overall pressure of the treatment atmosphere to 0.21 MPa, and then the ceramic crucible was heated at a temperature-rise rate of 1.7° C./min up to 730° C. and maintained for 15 hours, and thereafter cooled at a temperature-fall rate of 0.3° C./min down to room temperature while continuing oxygen inflow, thereby obtaining a spinel-type lithium manganese-containing composite oxide powder (sample).

Chemical analysis was performed with respect to the spinel-type lithium manganese-containing composite oxide powder (sample), and as a result, the components were Li: 4.1 wt o, Ni: 15.1 wt o, Mn: 42.5 wt o, and Ti: 2.7 wt %.

Example 6

A spinel-type lithium manganese-containing composite oxide powder (sample) was obtained in the same manner as Example 5 except that, in Example 5, Lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 1 μm, and yttrium oxide having an average particle diameter (D50) of 7 μm were used as a raw material, the weighed values of the raw materials were changed, the spray pressure in the granulation and drying was changed to 0.50 MPa, the slurry supply amount was set to 316 ml/min, and the calcination was performed so as to maintain a temperature of 850° C. for 37 hours.

Chemical analysis was performed with respect to the spinel-type lithium manganese-containing composite oxide powder (sample) obtained in Example 6, and as a result, the components were Li: 4.1 wt %, Ni: 14.2 wt %, Mn: 40.1 wt %, Ti: 5.3 wt %, and Y: 0.5 wt %.

Example 7

A spinel-type lithium manganese-containing composite oxide powder (sample) was obtained in the same manner as Example 5 except that, in Example 5, Lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 1 μm, and niobium oxide having an average particle diameter (D50) of 70 μm were used as a raw material, the weighed values of the raw materials were changed, the spray pressure in the granulation and drying was changed to 0.50 MPa, the slurry supply amount was set to 316 ml/min, and the calcination was performed so as to maintain a temperature of 850° C. for 37 hours.

Chemical analysis was performed with respect to the spinel-type lithium manganese-containing composite oxide powder (sample) obtained in Example 7, and as a result, the components were Li: 4.1 wt %, Ni: 14.2 wt %, Mn: 40.0 wt %, Ti: 5.3 wt %, and Nb: 0.5 wt %.

Example 8

A spinel-type lithium manganese-containing composite oxide powder (sample) was obtained in the same manner as Example 5 except that, in Example 5, Lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 1 μm, and molybdenum oxide having an average particle diameter (D50) of 29 μm were used as a raw material, the weighed values of the raw materials were changed, the spray pressure in the granulation and drying was changed to 0.5 MPa, the slurry supply amount was set to 316 ml/min, and the calcination was performed so as to maintain a temperature of 850° C. for 37 hours.

Chemical analysis was performed with respect to the spinel-type lithium manganese-containing composite oxide powder (sample) obtained in Example 8, and as a result, the components were Li: 4.1 wt %, Ni: 14.1 wt %, Mn: 40.1 wt %, Ti: 5.3 wt %, and Mo: 0.5 wt %.

Example 9

A spinel-type lithium manganese-containing composite oxide powder (sample) was obtained in the same manner as Example 5 except that, in Example 5, Lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 1 μm, and tungsten oxide having an average particle diameter (D50) of 62 μm were used as a raw material, the weighed values of the raw materials were changed, the spray pressure in the granulation and drying was changed to 0.5 MPa, the slurry supply amount was set to 312 ml/min, and the calcination was performed so as to maintain a temperature of 850° C. for 37 hours.

Chemical analysis was performed with respect to the spinel-type lithium manganese-containing composite oxide powder (sample) obtained in Example 9, and as a result, the components were Li: 4.0 wt %, Ni: 14.1 wt %, Mn: 39.9 wt %, Ti: 5.3 wt %, and W: 1.0 wt %.

Example 10

A spinel-type lithium manganese-containing composite oxide powder (sample) was obtained in the same manner as Example 5 except that, in Example 5, Lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (50) of 1 μm, and zirconium oxide having an average particle diameter (D50) of 31 μm were used as a raw material, the weighed values of the raw materials were changed, the spray pressure in the granulation and drying was changed to 0.5 MPa, the slurry supply amount was set to 313 ml/min, and the calcination was performed so as to maintain a temperature of 850° C. for 37 hours.

Chemical analysis was performed with respect to the spinel-type lithium manganese-containing composite oxide powder (sample) obtained in Example 10, and as a result, the components were Li: 4.0 wt %, Ni: 14.2 wt %, Mn: 40.1 wt %, Ti: 5.3 wt %, and Zr: 0.5 wt %.

Comparative Example 1

Lithium carbonate having an average particle diameter (D50) of 7 μm, electrolytic manganese dioxide having an average particle diameter (D50) of 23 μm and a specific surface area of 40 m$^2$/g, and nickel hydroxide having an average particle diameter (D50) of 22 μm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to the total amount of the Li raw material, the Ni raw material, and the Mn raw material, and the dispersant was sufficiently dissolved in and mixed with the ion-exchanged water. The raw materials that had been weighed were added to the ion-exchanged water, in which the dispersant was dissolved in advance, and the resultant mixture was mixed and stirred to prepare a slurry having a solid content concentration of 40 wt %.

The slurry was pulverized using a wet pulverizing machine at 1,300 rpm for 120 minutes such that an average particle of diameter (D50) thereof became 0.60 μm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying was performed under conditions in which a spray pressure was set to 0.19 MPa, a slurry supply amount was set to 350 ml/min, and a temperature was adjusted such that an outlet temperature of a drying tower became 100 to 110° C.

The obtained granulated powder was calcined, using a stationary electric furnace, under an atmosphere in which an oxygen partial pressure is 0.021 MPa so as to maintain a temperature of 950° C. for 37 hours, and then was heat treated under an atmosphere in which an oxygen partial pressure is 0.021 MPa so as to maintain a temperature of 750° C. for 37 hours.

The calcined powder obtained by the heat treatment was classified using a sieve having an aperture of 53 μm, and the powder under the sieve was collected to obtain a spinel-type lithium manganese-containing composite oxide powder (sample).

Chemical analysis was performed with respect to the spinel-type lithium manganese-containing composite oxide powder (sample) thus obtained, and as a result, the components were Li: 3.9 wt %, Ni: 16.0 wt %, and Mn: 43.0 wt %.

Comparative Example 2

Lithium carbonate having an average particle diameter (D50) of 7 μm, electrolytic manganese dioxide having an average particle diameter (D50) of 23 μm and a specific surface area of 40 m²/g, nickel hydroxide having an average particle diameter (D50) of 22 μm, titanium oxide having an average particle diameter (D50) of 2 μm, and lithium tetraborate having an average particle diameter (D50) of 60 μm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to the total amount of the Li raw material, the Ni raw material, the Mn raw material, the Ti raw material, and the B raw material, and the dispersant was sufficiently dissolved in and mixed with the ion-exchanged water. The raw materials that had been weighed were added to the ion-exchanged water, in which the dispersant was dissolved in advance, and the resultant mixture was mixed and stirred to prepare a slurry having a solid content concentration of 40 wt %. Further, the slurry was pulverized using a wet pulverizing machine at 1,300 rpm for 60 minutes, thereby obtaining a pulverized slurry having an average particle diameter (D50) of 0.60 μm or less.

The pulverized slurry thus obtained was granulated and dried using a thermal spray dryer (Spray Dryer "RL-10", manufactured by Ohkawara Kakohki Co., Ltd.). In so doing, a twin jet nozzle was used for spraying, and the granulation and drying was performed under conditions in which a spray pressure was set to 0.33 MPa, a slurry supply amount was set to 350 ml/min, and a temperature was adjusted such that an outlet temperature of a drying tower became 100 to 110° C.

The obtained granulated powder was calcined, using a stationary electric furnace, under an atmosphere in which an oxygen partial pressure is 0.021 MPa so as to maintain a temperature of 880° C. for 37 hours, and then was heat treated under an atmosphere in which an oxygen partial pressure is 0.021 MPa so as to maintain a temperature of 750° C. for 37 hours.

The calcined powder obtained by the heat treatment was crushed using a pestle, and the resultant crushed powder was classified using a sieve having an aperture of 53 μm, thereby obtaining a spinel-type lithium manganese-containing composite oxide powder.

Next, 1 kg of the spinel-type lithium manganese-containing composite oxide powder that was obtained by collecting the powder under the sieve as described above was introduced into a plastic beaker (capacity of 5,000 mL) which was filled with ion-exchanged water having a pH of 6 to 7, a temperature of 25° C., and a volume of 2,000 mL, and the content was stirred using a stirrer (propeller area of 33 cm²) at a rotation speed of 400 to 550 rpm for 20 minutes. After stirring, a precipitate was recovered using a suction filtration machine (filter paper No. 131), and the precipitate thus recovered was dried in an environment of 120° C. for 12 hours. Thereafter, the resultant sample was dried for 7 hours in a state of being heated so as to have the product temperature of 500° C. After drying, the resultant dried sample was classified using a sieve having an aperture of 53 μm, and the powder under the sieve was collected to obtain a spinel-type lithium manganese-containing composite oxide powder (sample).

Chemical analysis was performed with respect to the spinel-type lithium manganese-containing composite oxide powder (sample) thus obtained, and as a result, the components were Li: 3.9 wt %, Ni: 13.8 wt %, Mn: 43.9 wt %, Ti: 3.6 wt %, and B: 0.1 wt %.

Comparative Example 3

Lithium carbonate having an average particle diameter (D50) of 7 μm, electrolytic manganese dioxide having an average particle diameter (D50) of 23 μm and a specific surface area of 40 m²/g, nickel hydroxide having an average particle diameter (D50) of 22 μm, and titanium oxide having an average particle diameter (D50) of 2 μm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to the total amount of the Li raw material, the Ni raw material, the Mn raw material, and the Ti raw material, and the dispersant was sufficiently dissolved in and mixed with the ion-exchanged water. The raw materials that had been weighed were added to the ion-exchanged water, in which the dispersant was dissolved in advance, and the resultant mixture was mixed and stirred to adjust a slurry having a solid content concentration of 40 wt %. The slurry was pulverized using a wet pulverizing machine at 1,300 rpm for 60 minutes, thereby obtaining a pulverized slurry having an average particle diameter (D50) of 0.60 μm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying was performed under conditions in which a spray pressure was set to 0.46 MPa, a slurry supply amount was set to 250 ml/min, and a temperature was adjusted such that an outlet temperature of a drying tower became 100 to 110° C.

The obtained granulated powder was calcined, using a stationary electric furnace, under an atmosphere in which an oxygen partial pressure is 0.021 MPa by maintaining a temperature of 750° C. for 37 hours.

The calcined powder thus obtained was crushed using a pestle, and the resultant crushed powder was classified using a sieve having an aperture of 53 µm, thereby obtaining a spinel-type lithium manganese-containing composite oxide powder (sample).

Chemical analysis was performed with respect to the spinel-type lithium manganese-containing composite oxide powder (sample) thus obtained, and as a result, the components were Li: 4.0 wt %, Ni: 15.2 wt %, Mn: 39.7 wt %, and Ti: 5.0 wt %.

Comparative Example 4

A spinel-type lithium manganese-containing composite oxide powder (sample) was obtained in the same manner as Comparative Example 3 except that, in Comparative Example 3, the calcination temperature was changed to 800° C.

Chemical analysis was performed with respect to the spinel-type lithium manganese-containing composite oxide powder (sample), and as a result, the components were Li: 4.0 wt %, Ni: 15.2 wt %, Mn: 39.7 wt %, and Ti: 5.0 wt %.

<Method for Measuring Various Physical Property Values>

Various physical property values of the spinel-type lithium manganese-containing composite oxide powders (samples) obtained in Examples and Comparative Examples were measured as follows.

(Chemical Analysis)

For each of the spinel-type lithium manganese-containing composite oxide powders (samples) obtained in Examples and Comparative Examples, the content of the respective elements was measured by inductively coupled plasma (ICP) emission spectroscopy. The sulfur content thereof was also measured in the same manner as the above.

(Method for measuring amount of moisture according to Karl-Fischer method)

The amount of moisture released when each of the spinel-type lithium-manganese-containing composite oxide powders samples) obtained in Examples and Comparative Examples was heated using a Karl-Fischer moisture meter (CA-100 type, manufactured by Mitsubishi Chemical Corp.), inside the apparatus set at 170° C. in a nitrogen atmosphere for 45 minutes, was measured. Subsequently, the temperature was increased to 300° C., and then the amount of moisture released when the powder was heated at 300° C. for 45 minutes was measured.

Then, the measurement value of the amount of moisture released when the powder was heated in the apparatus set at 170° C. in a nitrogen atmosphere for 45 minutes was adopted as "KF moisture (ppm) at room temperature to 17020 C.", the amount of moisture released when the powder was heated at 300° C. for 45 minutes was designated as "KF moisture (ppm) at 170° C. to 300° C.", and the total amount of the "KF moisture (ppm) at room temperature to 170° C." and the "KF moisture (ppm) at 170° C. to 300° C." was designated as "KF moisture (ppm)".

(D50)

For each of the spinel-type lithium manganese-containing composite oxide powders (samples) obtained in Examples and Comparative Examples, the sample (powder) was introduced into an aqueous solvent using an automatic sample supply machine for laser diffraction particle size distribution measuring apparatus ("Microtrac SDC", manufactured by Nikkiso Co., Ltd.), and the sample was irradiated for 360 seconds with ultrasonic waves of 40 W at a flow rate of 40%. Subsequently, the particle size distribution was measured using a laser diffraction particle size distribution measuring apparatus "MT3000II" manufactured by Nikkiso Co., Ltd., and a D50 value was measured from a chart of the volume-based particle size distribution thus obtained.

Meanwhile, at the time of measurement, the watersoluble solvent was filtered through a filter having a pore size of 60 µm, and the average value obtained by making two measurements under the conditions of a solvent refractive index of 1.33, penetration for the particle penetrability conditions, a particle refractive index of 2.46, a non-spherical shape, a measurement range of 0.133 to 704.0 µm, and a measurement time of 30 seconds, was defined as D50.

(Average primary particle size)

The average primary particle size (primary particle average diameter) of each of the spinel-type lithium-manganese-containing composite oxide powders (samples) obtained in Examples and Comparative Examples was measured as follows.

The sample (powder) was observed using a SEM (scanning electron microscope) at a magnification of 1,000 times, and particles having a size corresponding to D50 were selected. Next, the sample (powder) was photographed by changing a magnification from 2,000 to 10,000 times in accordance with D50. An image which is suitable for obtaining the average primary particle size by using an image analysis software which will be described later can be photographed by setting a photographing magnification to, for example, 10,000 times when the D50 is about 7 µm, 5,000 times when the D50 is about 15 µm, and 2,000 times when the D50 is about 22 µm.

For the photographed image, the average primary particle size of the selected particles was obtained using an image analysis software (MAC-VIEW ver. 4, manufactured by Mountech Co., Ltd.). Here, the average primary particle size means a 50% accumulated particle diameter in a volume distribution (Heywood diameter: equivalent circle diameter).

Further, to calculate the average primary particle size, it is preferable to measure 50 or more primary particles. Therefore, when the number of the measurement particles was insufficient, the measurement was performed by additionally selecting the particles having a size equivalent to D50 and photographing so that the number of the primary particles became 50 pieces or more in total.

(Specific Surface Area)

The specific surface area (SSA) of each of the spinel-type lithium manganese-containing composite oxide powders (samples) obtained in Examples and Comparative Examples was measured as follows.

First, 0.5 g of the sample (powder) was weighed in a glass cell for a flow-type gas adsorption-measuring specific surface area analyzer, MONOSORB LOOP (product name "MS-18", manufactured by Yuasa Ionics, Inc.). The inside of the glass cell was replaced by a nitrogen gas for 5 minutes at a gas flow rate of 30 mL/min using a pre-treatment apparatus for the MONOSORB LOOP, and then a heat treatment was performed at 250° C. for 10 minutes in the nitrogen gas atmosphere. Thereafter, the sample (powder) was measured by a BET one-point method using the MONOSORB LOOP.

Meanwhile, as the adsorption gas in the measurement, a mixed gas of 30% of nitrogen and 70% of helium was used.

(Tap Density)

The powder packing density was determined when 30 g of each of the spinel-type lithium manganese-containing composite oxide powders (samples) obtained in Examples and Comparative Examples was put in a 150 ml glass measuring cylinder, and the measuring cylinder was tapped 350 times in a stroke of 60 mm using a shaking specific gravity meter (KRS-409, manufactured by Kuramochi Kagaku Kikai Seisakusho K.K.).

(Identification of Crystal Structure and Lattice Constant)

The XRD measurement was performed under the following measurement condition 1 using an XRD measurement apparatus (apparatus name "Ultima IV", manufactured by Rigaku Corporation) to obtain an XRD pattern. In regard to the obtained XRD pattern, the crystal phase information was determined using an integrated X-ray powder diffraction software PDXL (manufactured by Rigaku Corporation), and was refined by the WPPF (Whole powder pattern fitting) method to obtain a lattice constant. Here, on the assumption that the crystal phase information is attributed to a cubic crystal of a space group Fd-3m (Origin Choice 2), and the 8a site is occupied by Li, the 16d site is occupied by Mn, M1 element, M2 element, and an excessive Li content a, and the 32e site is occupied by O, a seat occupancy and an atomic displacement parameter B on each site were fixed to 1, and the calculation was repeatedly performed until Rwp and S which represent the degree of coincidence of an observed intensity with a calculated intensity converged. The observed intensity and the calculated intensity are sufficiently coincident means that the obtained sample is not limited to the space group, and has high reliability to have a spinel-type crystal structure.

=XRD Measurement Condition 1=

X-ray source: CuKα (line focus), wavelength: 1.541836 Å

Operation axis: 2θ/θ, measurement method: continuous, counting unit: cps

Initiation angle: 15.0°, termination angle: 120.0°, integration times: 1 time

Sampling width: 0.01°, scanning speed: 1.0°/min

Voltage: 40 kV, current: 40 mA

Divergence slit: 0.2 mm, divergence vertical restriction slit: 2 mm

Scattering slit: 2°, light-receiving slit: 0.15 mm

Offset angle: 0°

Goniometer radius: 285 mm, optical system: convergence method

Attachment: ASC-48

Slit: slit for D/teX Ultra

Detector: D/teX Ultra

Incident-monochro: CBO

Ni-Kβ filter: None

Speed of revolution: 50 rpm (Crystallite Size)

The measurement of an X-ray diffraction pattern for obtaining a crystallite size was performed under the following measurement condition 2 using an X-ray diffractometer (D8 ADVANCE, manufactured by Bruker AXS K.K.) using a Cu-Kα ray. Peaks in the X-ray diffraction pattern obtained from a range of diffraction angle 2θ=10 to 120° were analyzed using an analysis software (product name "Topas Version 3") to obtain a crystallite size.

Meanwhile, on the assumption that the crystal structure is attributed to a cubic crystal of a space group Fd-3m (Origin Choice 2), and Li is present at the 8a site, Mn, M1 element, M2 element, and an excessive Li content a are present at the 16d site, and the 32e site is occupied by O, a parameter Beq. was fixed to 1, a fraction coordinate and a seat occupancy of O in the 32e site was set as a variable, and the calculation was repeatedly performed until the indices Rwp and GOF, which represent the degree of coincidence of an observed intensity with a calculated intensity, converged to Rwp<10.0 and GOF<2.0 as a guide. Incidentally, the crystallite size and the strain were analyzed by using Gauss function to obtain the crystallite size.

=XRD Measurement Condition 2=

Ray source: CuKα, operation axis: 2θ/θ, measurement method: continuous, counting unit: cps Initiation angle: 10°, termination angle: 120°

Detector: PSD

Detector Type: VANTEC-1

High Voltage: 5,585 V

Discr. Lower Level: 0.25 V

Discr. Window Width: 0.15 V

Grid Lower Level: 0.075 V

Grid Window Width: 0.524 V

Flood Field Correction: Disabled

Primary radius: 250 mm

Secondary radius: 250 mm

Receiving slit width: 0.1436626 mm

Divergence angle: 0.3°

Filament Length: 12 mm

Sample Length: 25 mm

Receiving Slit Length: 12 mm

Primary Sollers: 2.623°

Secondary Sollers: 2.623°

Lorentzian, 1/Cos: 0.004933548 Th (Observation of Electron Diffraction Image from Transmission Electron Microscope (TEM))

Each of the spinel-type lithium manganese-containing composite oxide powders (samples) obtained in Examples and Comparative Examples was scattered on a microgrid coat adhered mesh (200 mesh Cu, manufactured by Nisshin EM Co., Ltd.), and excess powder was removed by air-blowing. Thereafter, the powder (sample) was set on a dedicated TEM (Transmission Electron Microscopy) holder.

A selected area electron diffraction image was acquired using a transmission electron microscope (JEM-ARM200F, manufactured by JEOL Ltd.). An electron diffraction image was acquired from a range of about 100 nm in diameter by using an acceleration voltage of 200 kV and a selected area aperture of 10 μm in diameter. In the acquirement of the electron diffraction image, the data was acquired by tilting the sample holder to match the angle to a crystal zone axis (direction to which an electron ray is being incident with respect to a specific sample face in parallel), thereby obtaining the electron diffraction image.

The crystal structure was identified by analyzing the electron diffraction image obtained as described above. Since different images can be obtained by changing the direction to which an electron ray is being incident, it is a characteristic that the structure analysis can be performed by utilizing these information complementarily.

Indexing of the diffraction spot and determination of crystal orientation was performed according to a method described on page 27 of "lecture textbook for 20th electron microscopy college (edited and published by The Japanese Society of Microscopy, The Electron Microscopy College Planning Board, and the like)".

Figure 2:
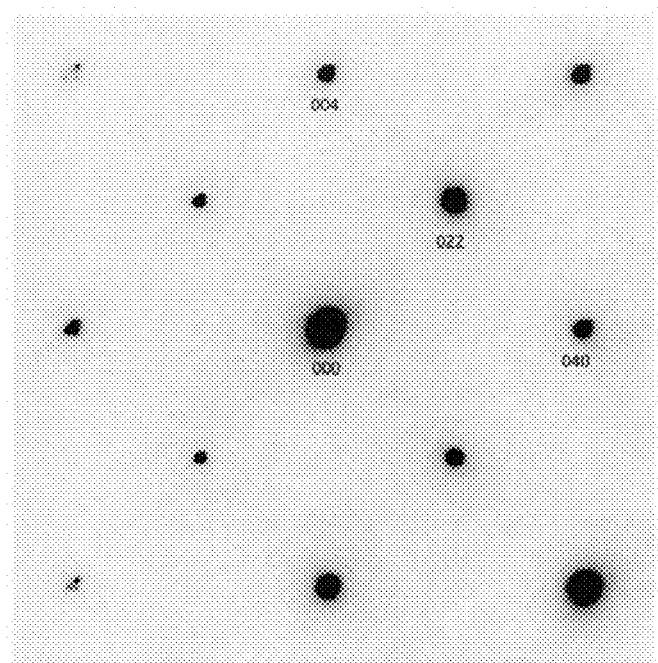
FIG. 2 is an electron diffraction image of a lithium manganese-containing composite oxide obtained in Comparative Example 4 from a transmission electron microscope (TEM).

As an example, electron diffraction images in Example 1 and Comparative Example 4 at incidence from crystal zone axis <100>when the indexing of the diffraction spot and the calculation of incident direction are performed as P4₃32 structure or Fd-3m structure, are illustrated in FIG. 1 and FIG. 2. When a diffraction spot intensity of the electron ray is higher than a background intensity, diffraction spots of the electron diffraction as illustrated in FIG. 1 and FIG. 2 appear.

By proceeding the steps as described above, the crystal structure can be identified from the electron diffraction.

Further, in regard to the identification of the crystal structure from the electron diffraction, the validity thereof can be enhanced also by utilizing an identification result from a diffraction pattern obtained by XRD.

<Evaluation of Battery>

By using the spinel-type lithium manganese-containing composite oxide powders (samples) produced in Examples and Comparative Examples as positive electrode active materials, 2032-type coin batteries and laminate-type batteries were produced, and the following battery performance evaluation test, cycle characteristics evaluation test and gas generation evaluation test were performed using these batteries.

(Production of Coin Battery)

89 parts by mass of the spinel-type lithium manganese-containing composite oxide powder (sample) produced in Examples and Comparative Examples as a positive electrode active material, 5 parts by mass of acetylene black, and 6 parts by mass of polyvinylidene fluoride (PVDF) were weighed and mixed, and 100 parts by mass of 1-methyl-2-pyrrolidone (NMP) was added thereto to prepare a positive electrode mixture slurry (solid content concentration of 50% by mass).

In so doing, the PVDF was dissolved in the NMP in advance, and the positive electrode active material and the acetylene black were added thereto. The resultant mixture was then solid-kneaded to prepare a positive electrode mixture slurry (solid content concentration of 50% by mass).

This positive electrode mixture slurry was coated on an aluminum foil which serves as a current collector using a coating machine at a conveying speed of 20 cm/min, and was then heated using the coating machine such that a temperature was maintained at 70° C. for 2 minutes. Thereafter, the resultant heated sample was dried such that a temperature was maintained at 120° C. for 2 minutes to form a positive electrode mixture layer, thereby obtaining an aluminum foil having the positive electrode mixture layer. Next, this aluminum foil having the positive electrode mixture layer was punched to a size of 50 mm×100 mm by an electrode, and was press-consolidated using a roll-press machine at a linear pressure of 3 t/cm. The resultant consolidated foil was then punched to a size of φ13 mm. Next, the resultant punched foil was heated up from room temperature to 200° C. in a vacuum state, and was heated and dried such that a temperature was maintained at 200° C. for 6 hours, thereby serving as a positive electrode.

A negative electrode was adopted as metal Li with a size of φ14 mm X thickness of 0.6 mm, and a separator (made of porous polyethylene film) that was impregnated with an electrolytic solution prepared by dissolving LiPF6 in a carbonate-based mixed solvent so as to be 1 mol/L, was placed, thereby producing a 2032-type coin battery.

(Battery Performance Evaluation Test)

The 2032-type coin battery prepared as described above was subjected to an initial activation using a method described in the following. The battery was charged at 25° C. in a 0.1 C constant current/constant potential up to 4.999 V, and thereafter discharged in a 0.1 C constant current down to 3.0 V. This process was repeated in three cycles. Here, the current value actually set was calculated from the content of the positive electrode active material in the positive electrode.

In the above evaluation, the ratio of A/B was obtained where A denoted a discharge capacity in a range of 4.999 to 4.5 V and B denoted a discharge capacity in a range of 4.999 to 3.0 V. It can be considered that as the ratio of A/B becomes larger, the high potential capacity region is expanded.

(Evaluation of 45° C. Cycle Characteristics)

A positive electrode for the coin battery was prepared in the same manner as the above. A negative electrode sheet (electrode capacity of 1.6 mAh/cm², manufactured by Piotrek Co., Ltd.) on which natural spherical graphite was coated, was used as a negative electrode, and was punched to a size of φ14 mm. A separator (made of porous polyethylene film) that was impregnated with an electrolytic solution prepared by dissolving $LiPF_6$ in a carbonate-based mixed solvent so as to be 1 mol/L, was placed, thereby producing a 2032-type coin battery.

The 2032-type coin battery prepared as described above was subjected to an initial activation using a method described in the following. The battery was charged at 25° C. in a 0.1 C constant current/constant potential up to 4.9 V, and thereafter discharged in a 0.1 C constant current down to 2.9 V. This process was repeated in three cycles. Here, the current value actually set was calculated from the content of the positive electrode active material in the positive electrode.

A charge and discharge test was performed using the coin battery after being subjected to the initial activation as described above, and the high-temperature charge-discharge cycle ability was evaluated according to the following method. A cell was put in an environmental testing chamber whose environmental temperature at which the cell is charged and discharged was set at 45° C. to be able to be charged and discharged. The cell was left to stand for 4 hours such that the cell temperature became the environmental temperature, and thereafter, with the charge and discharge range being set at 4.9 V to 2.9 V, the first-cycle charge and discharge was performed in which charge was performed in a 0.1 C constant current/constant potential and discharge was performed in a 0.1 C constant current, and the charge and discharge cycle was then performed 200 times at 1 C. C rate was calculated on the basis of 25° C. in the initial activation and the discharge capacity at third cycle.

The percentage (%) of the value obtained by the dividing discharge capacity at 200th cycle by the discharge capacity at 2nd cycle was obtained as a value for high-temperature charge-discharge cycle ability.

In Table 1, the value for high-temperature charge-discharge cycle ability from each Example and Comparative Example was described as a relative value when the value for high-temperature charge-discharge cycle ability of Comparative Example 2 was set at 100.

(Production of Laminate-Type Battery)

89 parts by mass of the spinel-type lithium manganese-containing composite oxide powder (sample) produced in Examples and Comparative Examples as a positive electrode active material, 5 parts by mass of acetylene black, and 6 parts by mass of polyvinylidene fluoride (PVDF) were weighed and mixed, and 100 parts by mass of 1-methyl-2-pyrrolidone (NMP) was added thereto to prepare a positive electrode mixture slurry (solid content concentration of 50% by mass). In so doing, the PVDF was dissolved in the NMP in advance, and the positive electrode active material and the acetylene black were added thereto. The resultant mixture was then solid-kneaded to prepare a positive electrode mixture slurry (solid content concentration of 50% by mass).

This positive electrode mixture slurry was coated on an aluminum foil which serves as a current collector using a coating machine at a conveying speed of 20 cm/min, and was then heated using the coating machine such that a temperature was maintained at 70° C. for 2 minutes. Thereafter, the resultant heated sample was dried such that a temperature was maintained at 120° C. for 2 minutes to form a positive electrode mixture layer, thereby obtaining an aluminum foil having the positive electrode mixture layer. Next, this aluminum foil having the positive electrode mixture layer was punched to a size of 50 mm×100 mm by an electrode, and was press-consolidated using a roll-press machine at a linear pressure of 3 t/cm. The resultant consolidated foil was then punched into a square of 40 mm×29 mm. Next, the resultant punched foil was heated up from room temperature to 200° C. in a vacuum state, and was heated and dried such that a temperature was maintained at 200° C. for 6 hours, thereby serving as a positive electrode.

The positive electrode sheet thus obtained was served as a positive electrode, and a negative electrode sheet (electrode capacity of 1.6 mAh/cm², manufactured by Piotrek Co., Ltd.) on which natural spherical graphite was coated, was cut to a size of 3.1 cm×4.2 cm to serve as a negative electrode. A separator (made of porous polyethylene film) that was impregnated with an electrolytic solution prepared by dissolving $LiPF_6$ in a carbonate-based mixed solvent so as to be 1 mol/L, was interposed between the positive electrode and the negative electrode, thereby producing a laminate-type battery.

(Gas Generation Evaluation Test)

The laminate-type battery produced by the method described above was left to stand for 12 hours, and then the battery was charged to 4.9 V at 25° C. in a 0.05 C constant current/constant potential, and thereafter discharged to 2.9 V in a constant current. Thereafter, the measurement environment temperature was set to 45° C., and the laminate-type battery was left to stand for 4 hours. Subsequently, the battery was charged to 4.9 V at 0.05 C and maintained the voltage for 7 days, and thereafter discharged to 2.9 V. The amount of gas generation (mL) generated up to this stage was measured by a volumetric immersion method (solvent replacement method based on Archimedes' principle). The amount of gas generation per positive electrode active material amount (mL/g) was calculated from the obtained gas generation amount and the positive electrode active material amount in the positive electrode sheet. Here, for the value of Comparative Example 2 in the table, the amount of gas generation was described as 100 as an index.

The term "M element species" in the following Table 1 means constituent elements of spinel-type lithium manganese-containing composite oxide other than Li, Mn and O.

TABLE 1

| | | Example 1 | Example 2 | Example 3 | Example 4 | Example 5 | Example 13 | Example 7 |
|---|---|---|---|---|---|---|---|---|
| Li | wt % | 4.2 | 4.1 | 4.0 | 4.0 | 4.1 | 4.1 | 4.1 |
| Ni | wt % | 13.2 | 13.6 | 15.8 | 15.9 | 15.1 | 14.2 | 14.2 |
| Mn | wt % | 41.6 | 41.7 | 40.9 | 40.7 | 42.5 | 40.1 | 40.0 |
| M element species | — | Ni, Ti | Ni, Ti | Ni, Ti | Ni, Ti, Al | Ni, Ti | Ni, Ti, Y | Ni, Ti, Nb |
| D50 | μm | 20 | 12 | 24 | 24 | 11 | 9 | 10 |
| Primary particle size | μm | 6.8 | 6.5 | 9.7 | 9.6 | 1.5 | 1.2 | 1.6 |
| SSA | m²/g | 0.16 | 0.24 | 0.10 | 0.12 | 0.85 | 0.99 | 0.71 |
| Tap density | g/cm³ | 1.7 | 2.2 | 2.1 | 2.0 | 1.0 | 0.9 | 1.0 |
| Lattice constant | Å | 8.190 | 8.191 | 8.193 | 8.193 | 8.177 | 8.187 | 8.188 |
| Rwp | — | 4.7 | 4.3 | 4.1 | 4.1 | 5.2 | 6.2 | 5.4 |
| S | — | 2.0 | 1.8 | 1.7 | 1.7 | 1.9 | 2.2 | 1.9 |
| Crystallite size | nm | 154 | 147 | 161 | 155 | 153 | 133 | 164 |
| Electron diffraction spot (presence or absence of spot other than Fd-3m) | — | Presence | Presence | Presence | Presence | Presence | Presence | Presence |
| 011 spot is present between spots of 000 and 022, by incidence from crystal zone. axis <100> | | ◯ | ◯ | ◯ | ◯ | ◯ | ◯ | ◯ |
| 4.999 to 4.5 V Discharge capacity A | mAh/g | 116 | 116 | 119 | 119 | 124 | 120 | 112 |
| 4.999 to 3.0 V Discharge capacity B | mAh/g | 129 | 128 | 126 | 126 | 132 | 128 | 121 |
| A/S | % | 90 | 91 | 94 | 94 | 94 | 94 | 93 |
| Amount of gas generation | % | 39 | 59 | 29 | 34 | 93 | 80 | 63 |
| Cycle characteristic | % | 106 | 102 | 104 | 102 | 102 | 106 | 108 |

| | | Example 8 | Example 9 | Example 10 | Comparative Example 1 | Comparative Example 2 | Comparative Example 3 | Comparative Example 4 |
|---|---|---|---|---|---|---|---|---|
| Li | wt % | 4.1 | 4.0 | 4.0 | 3.9 | 3.9 | 4.00 | 4.00 |
| Ni | wt % | 14.1 | 14.1 | 14.2 | 16.0 | 13.6 | 15.20 | 15.20 |
| Mn | wt % | 40.1 | 39.9 | 40.1 | 43.0 | 43.9 | 39.70 | 39.70 |
| M element species | — | Ni, Ti, Mo | Ni, Ti, W | Ni, Ti, Zr | Ni | Ni, Ti | Ni, Ti | Ni, Ti |
| D50 | μm | 11 | 9 | 10 | 17 | 16 | 8 | 8 |
| Primary particle size | μm | 2.0 | 1.6 | 1.6 | 4.5 | 6.0 | 0.3 | 0.5 |
| SSA | m²/g | 0.59 | 0.58 | 0.96 | 0.18 | 0.25 | 5.60 | 2.90 |
| Tap density | g/cm³ | 1.1 | 1.3 | 1.0 | 1.7 | 2.3 | 1.0 | 1.1 |
| Lattice constant | Å | 8.189 | 8.190 | 8.188 | 8.170 | 8.194 | 8.187 | 8.188 |
| Rwp | — | 5.4 | 5.5 | 5.4 | 4.3 | 4.4 | 4.3 | 4.6 |
| S | — | 1.9 | 1.9 | 1.9 | 2.0 | 1.9 | 1.9 | 2.1 |
| Crystallite size | nm | 182 | 174 | 142 | 215 | 163 | 72 | 86 |
| Electron diffraction spot | — | Presence | Presence | Presence | Presence | Absence | Absence | Absence |

TABLE 1-continued

| | | | | | | | | |
|---|---|---|---|---|---|---|---|---|
| (presence or absence of spot other than Fd-3m) 011 spot is present between spots of 000 and 022, by incidence from crystal zone. axis <100> | | — | ○ | ○ | ○ | ○ | x | x | x |
| 4.999 to 4.5 V Discharge capacity A | mAh/g | 123 | 120 | 119 | 130 | 117 | 118 | 119 |
| 4.999 to 3.0 V Discharge capacity B | mAh/g | 130 | 128 | 128 | 135 | 134 | 133 | 133 |
| A/S | % | 94 | 94 | 93 | 96 | 87 | 89 | 89 |
| Amount of gas generation | % | 79 | 70 | 76 | 294 | 100 | 315 | 209 |
| Cycle characteristic | % | 101 | 102 | 106 | 90 | 100 | 60 | 82 |

(Considerations)

In any of Examples 1 to 10, it was confirmed by XRD measurement that the obtained lithium manganese-containing composite oxide is a 5 V class spinel which is fitted to a crystal structure model of a cubic crystal of a space group Fd-3m (Origin Choice 2), wherein Rwp and S which represent the degree of coincidence of an observed intensity with a calculated intensity are Rwp<10 or S<2.5. In addition, from the results of the battery performance evaluation tests, it was confirmed that the obtained lithium manganese-containing composite oxide has an operating potential of 4.5 V or more at a metal Li reference potential.

In any of Examples 1 to 10, in an electronic diffraction image of the obtained lithium manganese-containing composite oxide from a transmission electron microscope (TEM), a diffraction spot which is observed in Fd-3m structure as well as a diffraction spot which is not observed in the Fd-3m structure were confirmed. At this time, it was confirmed that the diffraction spot which is not observed in the Fd-3m structure has an intensity equal to or lower than that of the diffraction spot which is observed in the Fd-3m structure.

Further, the diffraction spot that appeared in the electronic diffraction image of Examples 1 to 10 is a diffraction spot which is observed in P4332 structure. For example, a diffraction spot, such as 001 in a case of incidence from crystal zone axis <100> was confirmed.

In contrast, in any of Comparative Examples 2 to 4, the diffraction spot which is not observed in the Fd-3m structure did not appear in the electronic diffraction image.

According to conventional technical documents, when it is a spinel-type lithium manganese-containing composite oxide consisting of Li, Ni, Mn, and O, a diffraction spot which is observed in the Fd-3m structure as well as a diffraction spot which is not observed in the Fd-3m structure have been confirmed. However, in other than the spinel-type lithium manganese-containing composite oxide comprising Li, Ni, Mn, and O, for example, in a spinel-type lithium manganese-containing composite oxide comprising Li, Mn, O, and two or more other elements, and the like, there has been no example in which the diffraction spot which is not observed in the Fd-3m structure was observed.

In any of Examples 1 to 10, in an electronic diffraction image of the obtained lithium manganese-containing composite oxide from a transmission electron microscope (TEM), a diffraction spot which is observed in the Fd-3m structure as well as a diffraction spot which is not observed in the Fd-3m structure were confirmed, that is, when indexing of the diffraction spot and calculation of incident direction are performed as the $P4_332$ structure, a diffraction spot of 011 could be confirmed between diffraction spots of 000 and 022 in a diffraction image of incidence from crystal zone axis <100>.

In contrast, in any of Comparative Examples 2 to 4, it was found that only the diffraction spots which can be observed in the Fd-3m structure appear in the electronic diffraction image.

Meanwhile, for each of the lithium manganese-containing composite oxides obtained in Examples 1 to 10, when the Raman spectroscopic analysis (measurement conditions are as follows: laser wavelength: 532 nm, object lens: 50 times, exposure time: 10 seconds, integration times: 20 times, measuring range: 100 to 1,000 nm) was performed according to a method described in the paragraph [0040] of JP-A No. 2014-110176, it was found that the number of peaks appeared in a range of 155 to 650 $cm^{-1}$ is not 11 peaks in any of the lithium manganese-containing composite oxides obtained in Examples 1 to 10.

As a result of a number of tests performed by the inventors of the present invention in addition to the above Examples, in regard to the 5 V class spinel comprising Li, Mn, O and two or more other elements, it was found that, in an electronic diffraction image from a transmission electron microscope (TEM), a shoulder at near 4 V is disappeared, a plateau region at near 4.5 V is expanded, a high potential capacity region is expanded, and thus energy density is increased, when the 5 V class spinel is the one in which a diffraction spot which is observed in the Fd-3m structure as well as a diffraction spot which is not observed in the Fd-3m structure are confirmed. It was also found that gas generation can be suppressed. Further, it was also found that by comprising Li, Mn, O and two or more other elements, the crystal structure can be stabilized, and thus the cycle characteristics can be enhanced.

The invention claimed is:

1. A spinel-type lithium manganese-containing composite oxide, comprising
    Li, Mn, O and two or more other elements,
    and having an operating potential of 4.5 V or more at a metal Li reference potential, wherein, in an electronic diffraction image from a transmission electron microscope (TEM), a diffraction spot which is observed in Fd-3m structure as well as a diffraction spot which is not observed in the Fd-3m structure are confirmed.

2. The spinel-type lithium manganese-containing composite oxide according to claim 1, wherein,
    in an electronic diffraction image from a transmission electron microscope (TEM),
    the diffraction spot which is not observed in the Fd-3m structure has an intensity equal to or lower than that of the diffraction spot which is observed in the Fd-3m structure.

3. The spinel-type lithium manganese-containing composite oxide according to claim 2, wherein,
in an electronic diffraction image from a transmission electron microscope (TEM),
the diffraction spot which is not observed in the Fd-3m structure is a diffraction spot which is observed in $P4_332$ structure.

4. The spinel-type lithium manganese-containing composite oxide according to claim 1, wherein,
in an electronic diffraction image from a transmission electron microscope (TEM),
the diffraction spot which is not observed in the Fd-3m structure is a diffraction spot which is observed in $P4_332$ structure.
wherein, in an electronic diffraction image from a transmission electron microscope (TEM), the diffraction spot which is observed in the $P4_3$ 32 structure is confirmed.

5. The spinel-type lithium manganese-containing composite oxide according to claim 1, wherein,
in an electronic diffraction image from a transmission electron microscope (TEM),
when indexing of the diffraction spot and calculation of incident direction are performed as the $P4_332$ structure, a diffraction spot of 011 is confirmed between diffraction spots of 000 and 022 in a diffraction image of incidence from crystal zone axis <100>.

6. The spinel-type lithium manganese-containing composite oxide according to claim 1, wherein
at least one element from the "two or more other elements" according to claim 1 is selected from the group consisting of Ni, Co and Fe, and another element is selected from the group consisting of Mg, Ti, Al, Ba, Cr, W, Mo, Y, Zr and Nb.

7. The spinel-type lithium manganese-containing composite oxide according to claim 1, wherein
the spinel-type lithium manganese-containing composite oxide is represented by formula (1): $Li[Li_aMn_{2-a-b-c}M1_bM2_c]O_{4-\delta}$ (wherein M1 represents one or two or more elements selected from the group consisting of Ni, Co and Fe, M2 represents one or two or more elements selected from the group consisting of Mg, Ti, Al, Ba, Cr, W, Mo, Y, Zr and Nb, a is 0.00 to 0.20, b is 0.20 to 1.20, and c is 0.001 to 0.400).

8. The spinel-type lithium manganese-containing composite oxide according to claim 1, wherein
the spinel-type lithium manganese-containing composite oxide is represented by formula (2): $Li[Li_aMn_{2-a-b-c}Ni_bM2_c]O_{4-\delta}$ (wherein M2 represents one or two or more elements selected from the group consisting of Co, Fe, Mg, Ti, Al, Ba, Cr, W, Mo, Y, Zr and Nb, a is 0.00 to 0.20, b is 0.20 to 0.70, and c is 0.001 to 0.400).

9. The spinel-type lithium manganese-containing composite oxide according to claim 1, wherein
the spinel-type lithium manganese-containing composite oxide is represented by formula (2): $Li[Li_aMn_{2-a-b-c}Ni_bM2_c]O_{4-\delta}$ (wherein M2 is Ti or Al, or both of the elements, a is 0.00 to 0.20, b is 0.20 to 0.70, and c is 0.001 to 0.400).

10. The spinel-type lithium manganese-containing composite oxide according to claim 1, wherein a tap density is 1.2 g/cm³ or more.

11. The spinel-type lithium manganese-containing composite oxide according to claim 1, wherein an average primary particle size is more than 0.5 μm.

12. The spinel-type lithium manganese-containing composite oxide according to claim 1, wherein a specific surface area (SSA) is 1.5 m²/g or less.

13. The spinel-type lithium manganese-containing composite oxide according to claim 1, wherein a crystallite size is 100 nm or more.

14. A lithium secondary battery having the spinel-type lithium manganese-containing composite oxide according to claim 1 as a positive electrode active material.

15. A spinel-type lithium manganese-containing composite oxide, comprising
Li, Mn, O and two or more other elements,
and having an operating potential of 4.5 V or more at a metal Li reference potential,
wherein, in an electronic diffraction image from a transmission electron microscope (TEM), the diffraction spot which is observed in the $P4_332$ structure is confirmed.

16. The spinel-type lithium manganese-containing composite oxide according to claim 15, wherein,
in an electronic diffraction image from a transmission electron microscope (TEM),
when indexing of the diffraction spot and calculation of incident direction are performed as the $P4_332$ structure, a diffraction spot of 011 is confirmed between diffraction spots of 000 and 022 in a diffraction image of incidence from crystal zone axis <100>.

17. The spinel-type lithium manganese-containing composite oxide according to claim 15, wherein
at least one element from the "two or more other elements" according to claim 1 is selected from the group consisting of Ni, Co and Fe, and another element is selected from the group consisting of Mg, Ti, Al, Ba, Cr, W, Mo, Y, Zr and Nb.

18. The spinel-type lithium manganese-containing composite oxide according to claim 15, wherein
the spinel-type lithium manganese-containing composite oxide is represented by formula (1): $Li[Li_aMn_{2-a-b-c}M1_bM2_c]O_{4-\delta}$ (wherein M1 represents one or two or more elements selected from the group consisting of Ni, Co and Fe, M2 represents one or two or more elements selected from the group consisting of Mg, Ti, Al, Ba, Cr, W, Mo, Y, Zr and Nb, a is 0.00 to 0.20, b is 0.20 to 1.20, and c is 0.001 to 0.400).

19. The spinel-type lithium manganese-containing composite oxide according to claim 15, wherein
the spinel-type lithium manganese-containing composite oxide is represented by formula (2): $Li[Li_aMn_{2-a-b-c}Ni_bM2_c]O_{4-\delta}$ (wherein M2 represents one or two or more elements selected from the group consisting of Co, Fe, Mg, Ti, Al, Ba, Cr, W, Mo, Y, Zr and Nb, a is 0.00 to 0.20, b is 0.20 to 0.70, and c is 0.001 to 0.400).

20. The spinel-type lithium manganese-containing composite oxide according to claim 15, wherein
the spinel-type lithium manganese-containing composite oxide is represented by formula (2): $Li[Li_aMn_{2-a-b-c}Ni_bM2_c]O_{4-\delta}$ (wherein M2 is Ti or Al, or both of the elements, a is 0.00 to 0.20, b is 0.20 to 0.70, and c is 0.001 to 0.400).

* * * * *

UNITED STATES PATENT AND TRADEMARK OFFICE
CERTIFICATE OF CORRECTION

PATENT NO. : 10,446,842 B2
APPLICATION NO. : 15/513331
DATED : October 15, 2019
INVENTOR(S) : Tetsuya Mitsumoto et al.

It is certified that error appears in the above-identified patent and that said Letters Patent is hereby corrected as shown below:

In the Claims

Column 37, Line 16-19, Claim 4, after "structure." delete "wherein, in an electronic diffraction image from a transmission electron microscope (TEM), the diffraction spot which is observed in the $P4_3 32$ structure is confirmed."

Column 38, Line 52, Claim 19, delete "$O_{4-\delta}$(wherein" and insert -- $O_{4-\delta}$ (wherein --

Column 38, Line 59, Claim 20, delete "M2is" and insert -- M2 is --

Signed and Sealed this
Thirty-first Day of December, 2019

Andrei Iancu
*Director of the United States Patent and Trademark Office*